United States Patent
Conant et al.

(10) Patent No.: US 9,001,787 B1
(45) Date of Patent: Apr. 7, 2015

(54) SYSTEM AND METHOD FOR IMPLEMENTING HANDOVER OF A HYBRID COMMUNICATIONS MODULE

(71) Applicant: Trilliant Networks, Inc., Redwood City, CA (US)

(72) Inventors: Robert Conant, Burlingame, CA (US); Vincent Bemmel, Dublin, CA (US); Alan Jacobsen, San Carlos, CA (US)

(73) Assignee: Trilliant Networks Inc., Redwood City, CA (US)

( * ) Notice: Subject to any disclaimer, the term of this patent is extended or adjusted under 35 U.S.C. 154(b) by 119 days.

(21) Appl. No.: 13/622,686

(22) Filed: Sep. 19, 2012

Related U.S. Application Data

(60) Provisional application No. 61/536,846, filed on Sep. 20, 2011.

(51) Int. Cl.
*H04W 4/00* (2009.01)
*H04W 36/00* (2009.01)
*H04W 36/04* (2009.01)

(52) U.S. Cl.
CPC ..................................... *H04W 36/04* (2013.01)

(58) Field of Classification Search
CPC ......... H04W 4/24; H04W 4/26; H04W 16/04; H04W 24/02; H04W 24/04; H04W 24/06; H04W 24/10; H04W 28/048; H04W 28/085; H04W 36/30; H04W 36/14; H04W 36/0083; H04W 36/0061; H04W 36/0072; H04W 36/08; H04W 36/22; H04W 36/26; H04W 36/32; H04W 36/36; H04W 48/16; H04W 52/146; H04W 52/18; H04W 52/243; H04W 52/244; H04W 52/247; H04W 52/40; H04W 64/006; H04W 72/082; H04W 72/0413; H04W 72/042; H04W 72/085; H04W 72/087; H04W 72/10; H04W 72/1215; H04W 74/004; H04W 74/0833; H04W 76/023; H04W 76/026; H04W 88/04; H04W 88/06; H04L 1/1812; H04L 1/1825; H04L 5/0048; H04L 5/0035; H04L 41/0654; H04L 63/12; H04L 65/4084; H04L 65/60; H04L 65/604; H04L 65/607; H04L 65/608; H04L 65/80; H04L 67/02; H04L 67/12; H04B 7/0626; H04B 7/0639; H04M 15/00; H04M 15/28

USPC ......... 370/311, 331, 338, 230, 252, 318, 392, 370/401, 231, 238, 255, 328, 329, 333, 341, 370/386, 428, 203; 455/436, 522, 13.4, 455/442, 438, 127.5, 343.5, 435.2, 437, 455/439, 443, 444, 448, 571; 713/340, 320

See application file for complete search history.

(56) References Cited

U.S. PATENT DOCUMENTS 4,132,981 A 1/1979 White .......................... 340/203
(Continued)

FOREIGN PATENT DOCUMENTS

| EP | 0 578 041 B1 | 11/1999 | ............ H04L 12/56 |
|---|---|---|---|
| EP | 0 663 746 B1 | 1/2003 | ............ H04L 12/46 |

(Continued)

OTHER PUBLICATIONS

Ahmad; Smart Metering and Home Automation Solutions for the Next Decade; IEEE; 2011 International Conference on Emerging Trends in Networks and Computer Communications (ETNCC); Apr. 22-24, 2011; pp. 202-204.*

(Continued)

*Primary Examiner* — Benjamin H Elliott, IV
*Assistant Examiner* — Eric Nowlin
(74) *Attorney, Agent, or Firm* — Moser Taboada

(57) ABSTRACT

A system and process for switching to or between multiple networks to optimize communication between an energy device, e.g., meter, in proximity to at least one of the multiple networks and a head end server to facilitate communication of energy-related data therebetween is described. The system includes a communications module associated with the energy device for controlling the switching between networks and/or the directing of energy-related data communications over different networks in accordance with data type.

27 Claims, 6 Drawing Sheets

(56) References Cited

U.S. PATENT DOCUMENTS

| | | | | |
|---|---|---|---|---|
| 4,190,800 | A | 2/1980 | Kelly, Jr. et al. | 325/37 |
| 4,204,195 | A | 5/1980 | Bogacki | 340/151 |
| 4,254,472 | A | 3/1981 | Juengel et al. | 364/900 |
| 4,322,842 | A | 3/1982 | Martinez | 370/11 |
| 4,396,915 | A | 8/1983 | Farnsworth et al. | 340/870.03 |
| 4,425,628 | A | 1/1984 | Bedard et al. | 364/900 |
| 4,638,314 | A | 1/1987 | Keller | 340/870.02 |
| 4,644,320 | A | 2/1987 | Carr et al. | 340/12.37 |
| 4,749,992 | A | 6/1988 | Fitzmeyer et al. | 340/870.02 |
| 4,792,946 | A | 12/1988 | Mayo | 370/245 |
| 4,939,726 | A | 7/1990 | Flammer et al. | 370/400 |
| 5,007,052 | A | 4/1991 | Flammer | 370/389 |
| 5,056,107 | A | 10/1991 | Johnson et al. | 375/138 |
| 5,077,753 | A | 12/1991 | Grau, Jr. et al. | 375/141 |
| 5,079,768 | A | 1/1992 | Flammer | 370/349 |
| 5,115,433 | A | 5/1992 | Baran et al. | 370/400 |
| 5,117,422 | A | 5/1992 | Hauptschein et al. | 370/255 |
| 5,130,987 | A | 7/1992 | Flammer | 370/436 |
| 5,138,615 | A | 8/1992 | Lamport et al. | 370/94.3 |
| 5,159,592 | A | 10/1992 | Perkins | 370/338 |
| 5,216,623 | A | 6/1993 | Barrett et al. | 364/550 |
| 5,276,680 | A | 1/1994 | Messenger | 370/311 |
| 5,311,581 | A | 5/1994 | Merriam et al. | 379/106.07 |
| 5,400,338 | A | 3/1995 | Flammer, III et al. | 370/255 |
| 5,430,729 | A | 7/1995 | Rahnema | 370/409 |
| 5,432,507 | A | 7/1995 | Mussino et al. | 340/870.03 |
| 5,453,977 | A | 9/1995 | Flammer, III et al. | 370/254 |
| 5,459,727 | A | 10/1995 | Vannucci | 370/332 |
| 5,463,777 | A | 10/1995 | Bialkowski et al. | 1/1 |
| 5,465,398 | A | 11/1995 | Flammer | 455/69 |
| 5,467,345 | A | 11/1995 | Cutter, Jr. et al. | 370/229 |
| 5,471,469 | A | 11/1995 | Flammer, III et al. | 370/346 |
| 5,479,400 | A | 12/1995 | Dilworth et al. | 370/331 |
| 5,488,608 | A | 1/1996 | Flammer, III | 370/400 |
| 5,515,369 | A | 5/1996 | Flammer, III et al. | 370/480 |
| 5,515,509 | A | 5/1996 | Rom | 709/228 |
| 5,528,507 | A | 6/1996 | McNamara et al. | 700/286 |
| 5,544,036 | A | 8/1996 | Brown, Jr. et al. | 364/145 |
| 5,553,094 | A | 9/1996 | Johnson et al. | 375/130 |
| 5,570,084 | A | 10/1996 | Retter et al. | 370/338 |
| 5,572,438 | A | 11/1996 | Ehlers et al. | 700/295 |
| 5,572,528 | A | 11/1996 | Shuen | 370/402 |
| 5,596,722 | A | 1/1997 | Rahnema | 709/241 |
| 5,608,721 | A | 3/1997 | Natarajan et al. | 370/238 |
| 5,608,780 | A | 3/1997 | Gerszberg et al. | 455/436 |
| 5,623,495 | A | 4/1997 | Eng et al. | 370/397 |
| 5,659,300 | A | 8/1997 | Dresselhuys et al. | 340/870.02 |
| 5,673,252 | A | 9/1997 | Johnson et al. | 370/449 |
| 5,684,710 | A | 11/1997 | Ehlers et al. | 700/293 |
| 5,696,501 | A | 12/1997 | Ouellette et al. | 340/870.02 |
| 5,696,695 | A | 12/1997 | Ehlers et al. | 700/286 |
| 5,717,718 | A | 2/1998 | Rowsell et al. | 375/260 |
| 5,719,564 | A | 2/1998 | Sears | 340/870.02 |
| 5,726,644 | A | 3/1998 | Jednacz et al. | 340/825.52 |
| 5,727,057 | A | 3/1998 | Emery et al. | 379/201.07 |
| 5,737,318 | A | 4/1998 | Melnik | 370/254 |
| 5,740,366 | A | 4/1998 | Mahany et al. | 709/227 |
| 5,748,104 | A | 5/1998 | Argyroudis et al. | 340/870.11 |
| 5,757,783 | A | 5/1998 | Eng et al. | 370/315 |
| 5,758,331 | A | 5/1998 | Johnson | 705/412 |
| 5,761,083 | A | 6/1998 | Brown, Jr. et al. | 364/492 |
| 5,767,790 | A | 6/1998 | Jovellana | 340/870.02 |
| 5,774,660 | A | 6/1998 | Brendel et al. | 709/201 |
| 5,812,531 | A | 9/1998 | Cheung et al. | 370/255 |
| 5,822,309 | A | 10/1998 | Ayanoglu et al. | 370/315 |
| 5,844,893 | A | 12/1998 | Gollnick et al. | 370/329 |
| 5,874,903 | A | 2/1999 | Shuey et al. | 340/870.02 |
| 5,880,677 | A | 3/1999 | Lestician | 340/825.06 |
| 5,892,758 | A | 4/1999 | Argyroudis | 370/335 |
| 5,894,422 | A | 4/1999 | Chasek | 364/528.26 |
| 5,896,097 | A | 4/1999 | Cardozo | 340/870.03 |
| 5,896,566 | A | 4/1999 | Averbuch et al. | 455/419 |
| 5,898,387 | A | 4/1999 | Davis et al. | 340/870.02 |
| 5,898,826 | A | 4/1999 | Pierce et al. | 714/4 |
| 5,901,067 | A | 5/1999 | Kao et al. | 700/11 |
| 5,903,566 | A | 5/1999 | Flammer, III | 370/406 |
| 5,914,672 | A | 6/1999 | Glorioso et al. | 340/870.02 |
| 5,914,673 | A | 6/1999 | Jennings et al. | 340/870.03 |
| 5,919,247 | A | 7/1999 | Van Hoff et al. | 709/217 |
| 5,920,697 | A | 7/1999 | Masters et al. | 709/219 |
| 5,926,531 | A | 7/1999 | Petite | 379/144.04 |
| 5,933,092 | A | 8/1999 | Ouellette et al. | 340/870.02 |
| 5,953,371 | A | 9/1999 | Rowsell et al. | 375/220 |
| 5,963,146 | A | 10/1999 | Johnson et al. | 340/870.01 |
| 5,963,457 | A | 10/1999 | Kanoi et al. | 364/528.26 |
| 5,974,236 | A | 10/1999 | Sherman | 709/221 |
| 5,986,574 | A | 11/1999 | Colton | 340/870.02 |
| 5,987,011 | A | 11/1999 | Toh | 370/331 |
| 5,991,806 | A | 11/1999 | McHann, Jr. | 709/224 |
| 6,014,089 | A | 1/2000 | Tracy et al. | 340/870.02 |
| 6,018,659 | A | 1/2000 | Ayyagari et al. | 455/431 |
| 6,026,133 | A | 2/2000 | Sokoler | 375/365 |
| 6,028,522 | A | 2/2000 | Petite | 340/641 |
| 6,044,062 | A | 3/2000 | Brownrigg et al. | 370/238 |
| 6,058,355 | A | 5/2000 | Ahmed et al. | 702/62 |
| 6,061,609 | A | 5/2000 | Kanoi et al. | 700/291 |
| 6,073,169 | A | 6/2000 | Shuey et al. | 709/217 |
| 6,075,777 | A | 6/2000 | Agrawal et al. | 370/329 |
| 6,078,785 | A | 6/2000 | Bush | 455/7 |
| 6,084,867 | A | 7/2000 | Meier | 370/338 |
| 6,088,659 | A | 7/2000 | Kelley et al. | 702/62 |
| 6,097,703 | A | 8/2000 | Larsen et al. | 370/254 |
| 6,108,699 | A | 8/2000 | Moiin | 709/221 |
| 6,118,269 | A | 9/2000 | Davis | 324/110 |
| 6,122,603 | A | 9/2000 | Budike, Jr. | 702/182 |
| 6,124,806 | A | 9/2000 | Cunningham et al. | 340/870.02 |
| 6,134,587 | A | 10/2000 | Okanoue | 709/222 |
| 6,137,423 | A | 10/2000 | Glorioso et al. | 340/870.02 |
| 6,150,955 | A | 11/2000 | Tracy et al. | 340/870.02 |
| 6,169,979 | B1 | 1/2001 | Johnson | 705/412 |
| 6,172,616 | B1 | 1/2001 | Johnson et al. | 340/870.12 |
| 6,195,018 | B1 | 2/2001 | Ragle et al. | 340/870.01 |
| 6,218,953 | B1 | 4/2001 | Petite | 340/641 |
| 6,233,327 | B1 | 5/2001 | Petite | 379/155 |
| 6,239,722 | B1 | 5/2001 | Colton et al. | 340/870.02 |
| 6,240,080 | B1 | 5/2001 | Okanoue et al. | 370/338 |
| 6,246,677 | B1 | 6/2001 | Nap et al. | 370/346 |
| 6,246,689 | B1 | 6/2001 | Shavitt | 370/406 |
| 6,298,053 | B1 | 10/2001 | Flammer, III et al. | 370/349 |
| 6,300,881 | B1 | 10/2001 | Yee et al. | 340/870.02 |
| 6,304,556 | B1 | 10/2001 | Haas | 370/254 |
| 6,311,105 | B1 | 10/2001 | Budike, Jr. | 700/291 |
| 6,338,087 | B1 | 1/2002 | Okanoue | 709/222 |
| 6,362,745 | B1 | 3/2002 | Davis | 340/637 |
| 6,363,057 | B1 | 3/2002 | Ardalan et al. | 370/252 |
| 6,366,217 | B1 | 4/2002 | Cunningham et al. | 340/870.31 |
| 6,369,719 | B1 | 4/2002 | Tracy et al. | 340/870.02 |
| 6,369,769 | B1 | 4/2002 | Nap et al. | 343/719 |
| 6,373,399 | B1 | 4/2002 | Johnson et al. | 340/870.11 |
| 6,396,839 | B1 | 5/2002 | Ardalan et al. | 370/401 |
| 6,400,949 | B1 | 6/2002 | Bielefeld et al. | 455/434 |
| 6,407,991 | B1 | 6/2002 | Meier | 370/338 |
| 6,415,330 | B1 | 7/2002 | Okanoue | 709/245 |
| 6,430,268 | B1 | 8/2002 | Petite | 379/39 |
| 6,437,692 | B1 | 8/2002 | Petite et al. | 340/540 |
| 6,457,054 | B1 | 9/2002 | Bakshi | 709/227 |
| 6,480,497 | B1 | 11/2002 | Flammer, III et al. | 370/400 |
| 6,480,505 | B1 | 11/2002 | Johansson et al. | 370/449 |
| 6,492,910 | B1 | 12/2002 | Ragle et al. | 340/870.02 |
| 6,509,841 | B1 | 1/2003 | Colton et al. | 340/870.11 |
| 6,522,974 | B2 | 2/2003 | Sitton | 702/17 |
| 6,535,498 | B1 | 3/2003 | Larsson et al. | 370/338 |
| 6,538,577 | B1 | 3/2003 | Ehrke et al. | 340/870.02 |
| 6,553,355 | B1 | 4/2003 | Arnoux et al. | 706/13 |
| 6,556,830 | B1 | 4/2003 | Lenzo | 455/450 |
| 6,577,671 | B1 | 6/2003 | Vimpari | 375/146 |
| 6,606,708 | B1 | 8/2003 | Devine et al. | 726/8 |
| 6,618,578 | B1 | 9/2003 | Petite | 455/92 |
| 6,618,772 | B1 | 9/2003 | Kao et al. | 710/15 |
| 6,628,764 | B1 | 9/2003 | Petite | 379/106.01 |
| 6,633,823 | B2 | 10/2003 | Bartone et al. | 702/57 |
| 6,636,894 | B1 | 10/2003 | Short et al. | 709/225 |
| 6,650,249 | B2 | 11/2003 | Meyer et al. | 340/870.28 |
| 6,653,945 | B2 | 11/2003 | Johnson et al. | 340/870.02 |

(56) References Cited

U.S. PATENT DOCUMENTS

| | | | |
|---|---|---|---|
| 6,657,552 B2 | 12/2003 | Belski et al. | 340/870.02 |
| 6,665,620 B1 | 12/2003 | Burns et al. | 702/62 |
| 6,671,635 B1 | 12/2003 | Forth et al. | 702/61 |
| 6,681,110 B1 | 1/2004 | Crookham et al. | 455/420 |
| 6,681,154 B2 | 1/2004 | Nierlich et al. | 700/286 |
| 6,684,245 B1 | 1/2004 | Shuey et al. | 709/223 |
| 6,687,901 B1 | 2/2004 | Imamatsu | 717/173 |
| 6,691,173 B2 | 2/2004 | Morris et al. | 709/249 |
| 6,697,331 B1 | 2/2004 | Riihinen et al. | 370/236 |
| 6,710,721 B1 | 3/2004 | Holowick | 340/870.02 |
| 6,711,166 B1 | 3/2004 | Amir et al. | 370/395.1 |
| 6,711,409 B1 | 3/2004 | Zavgren, Jr. et al. | 455/445 |
| 6,711,512 B1 | 3/2004 | Noh | 702/65 |
| 6,714,787 B2 | 3/2004 | Reed et al. | 455/445 |
| 6,718,137 B1 | 4/2004 | Chin | 398/3 |
| 6,725,281 B1 | 4/2004 | Zintel et al. | 719/318 |
| 6,728,514 B2 | 4/2004 | Bandeira et al. | 455/13.1 |
| 6,747,557 B1 | 6/2004 | Petite et al. | 340/540 |
| 6,747,981 B2 | 6/2004 | Ardalan et al. | 370/401 |
| 6,751,445 B2 | 6/2004 | Kasperkovitz et al. | 455/76 |
| 6,751,455 B1 | 6/2004 | Acampora | 455/414.1 |
| 6,751,672 B1 | 6/2004 | Khalil et al. | 709/230 |
| 6,772,052 B1 | 8/2004 | Amundsen et al. | 700/291 |
| 6,775,258 B1 | 8/2004 | van Valkenburg et al. | 370/338 |
| 6,778,099 B1 | 8/2004 | Mayer et al. | 340/870.02 |
| 6,785,592 B1 | 8/2004 | Smith et al. | 700/291 |
| 6,798,352 B2 | 9/2004 | Holowick | 340/870.02 |
| 6,801,865 B2 | 10/2004 | Gilgenbach et al. | 702/61 |
| 6,826,620 B1 | 11/2004 | Mawhinney et al. | 709/235 |
| 6,829,216 B1 | 12/2004 | Nakata | 370/228 |
| 6,829,347 B1 | 12/2004 | Odiaka | 379/220.01 |
| 6,831,921 B2 | 12/2004 | Higgins | 370/401 |
| 6,836,737 B2 | 12/2004 | Petite et al. | 702/62 |
| 6,839,775 B1 | 1/2005 | Kao et al. | 710/15 |
| 6,842,706 B1 | 1/2005 | Baraty | 702/61 |
| 6,845,091 B2 | 1/2005 | Ogier et al. | 370/338 |
| 6,859,186 B2 | 2/2005 | Lizalek et al. | 343/767 |
| 6,865,185 B1 | 3/2005 | Patel et al. | 370/412 |
| 6,882,635 B2 | 4/2005 | Eitan et al. | 370/338 |
| 6,885,309 B1 | 4/2005 | Van Heteren | 340/870.11 |
| 6,891,838 B1 | 5/2005 | Petite et al. | 370/401 |
| 6,900,738 B2 | 5/2005 | Crichlow | 340/870.02 |
| 6,904,025 B1 | 6/2005 | Madour et al. | 370/328 |
| 6,904,385 B1 | 6/2005 | Budike, Jr. | 702/182 |
| 6,909,705 B1 | 6/2005 | Lee et al. | 370/338 |
| 6,914,533 B2 | 7/2005 | Petite | 340/628 |
| 6,914,893 B2 | 7/2005 | Petite | 370/338 |
| 6,946,972 B2 | 9/2005 | Mueller et al. | 340/870.02 |
| 6,954,814 B1 | 10/2005 | Leach | 710/305 |
| 6,963,285 B2 | 11/2005 | Fischer et al. | 340/635 |
| 6,967,452 B2 | 11/2005 | Aiso et al. | 318/466 |
| 6,970,434 B1 | 11/2005 | Mahany et al. | 370/256 |
| 6,970,771 B1 | 11/2005 | Preiss et al. | 700/286 |
| 6,975,613 B1 | 12/2005 | Johansson | 370/338 |
| 6,980,973 B1 | 12/2005 | Karpenko | 705/412 |
| 6,982,651 B2 | 1/2006 | Fischer | 340/870.02 |
| 6,985,087 B2 | 1/2006 | Soliman | 340/870.02 |
| 6,985,714 B2* | 1/2006 | Akiyama et al. | 455/402 |
| 6,995,666 B1 | 2/2006 | Luttrell | 340/539.1 |
| 6,999,441 B2 | 2/2006 | Flammer, III et al. | 370/337 |
| 7,009,379 B2 | 3/2006 | Ramirez | 324/142 |
| 7,009,493 B2 | 3/2006 | Howard et al. | 340/7.1 |
| 7,010,363 B2 | 3/2006 | Donnelly et al. | 700/19 |
| 7,016,336 B2 | 3/2006 | Sorensen | 370/351 |
| 7,020,701 B1 | 3/2006 | Gelvin et al. | 709/224 |
| 7,042,368 B2 | 5/2006 | Patterson et al. | 340/870.29 |
| 7,046,682 B2 | 5/2006 | Carpenter et al. | 370/401 |
| 7,053,767 B2 | 5/2006 | Petite et al. | 340/531 |
| 7,053,853 B2 | 5/2006 | Merenda et al. | 343/820 |
| 7,054,271 B2 | 5/2006 | Brownrigg et al. | 370/238 |
| 7,062,361 B1 | 6/2006 | Lane | 700/295 |
| 7,064,679 B2 | 6/2006 | Ehrke et al. | 340/870.02 |
| 7,072,945 B1 | 7/2006 | Nieminen et al. | 709/217 |
| 7,079,810 B2 | 7/2006 | Petite et al. | 455/41.2 |
| 7,089,089 B2 | 8/2006 | Cumming et al. | 700/295 |
| 7,102,533 B2 | 9/2006 | Kim | 340/870.02 |
| 7,103,086 B2 | 9/2006 | Steed et al. | 375/132 |
| 7,103,511 B2 | 9/2006 | Petite | 702/188 |
| 7,106,044 B1 | 9/2006 | Lee, Jr. et al. | 324/110 |
| 7,119,713 B2 | 10/2006 | Shuey et al. | 340/870.02 |
| 7,126,494 B2 | 10/2006 | Ardalan et al. | 340/870.02 |
| 7,135,850 B2 | 11/2006 | Ramirez | 324/142 |
| 7,135,956 B2 | 11/2006 | Bartone et al. | 340/3.9 |
| 7,137,550 B1 | 11/2006 | Petite | 235/379 |
| 7,143,204 B1 | 11/2006 | Kao et al. | 710/18 |
| 7,145,474 B2 | 12/2006 | Shuey et al. | 340/870.03 |
| 7,170,425 B2 | 1/2007 | Christopher et al. | 340/870.02 |
| 7,174,260 B2 | 2/2007 | Tuff et al. | 702/61 |
| 7,185,131 B2 | 2/2007 | Leach | 710/305 |
| 7,188,003 B2 | 3/2007 | Ransom et al. | 700/286 |
| 7,197,046 B1 | 3/2007 | Hariharasubrahmanian | 370/466 |
| 7,200,633 B2 | 4/2007 | Sekiguchi et al. | 709/203 |
| 7,209,840 B2 | 4/2007 | Petite et al. | 702/62 |
| 7,215,926 B2 | 5/2007 | Corbett et al. | 455/41.2 |
| 7,222,111 B1 | 5/2007 | Budike, Jr. | 705/412 |
| 7,230,544 B2 | 6/2007 | Van Heteren | 340/870.03 |
| 7,230,931 B2 | 6/2007 | Struhsaker | 370/280 |
| 7,231,482 B2 | 6/2007 | Leach | 710/305 |
| 7,245,938 B2 | 7/2007 | Sobczak et al. | 455/562.1 |
| 7,248,181 B2 | 7/2007 | Patterson et al. | 340/870.03 |
| 7,248,861 B2 | 7/2007 | Lazaridis et al. | 455/414.1 |
| 7,250,874 B2 | 7/2007 | Mueller et al. | 340/870.06 |
| 7,251,570 B2 | 7/2007 | Hancock et al. | 702/57 |
| 7,263,073 B2 | 8/2007 | Petite et al. | 370/278 |
| 7,271,735 B2 | 9/2007 | Rogai | 340/870.02 |
| 7,274,305 B1 | 9/2007 | Luttrell | 340/870.02 |
| 7,274,975 B2 | 9/2007 | Miller | 700/295 |
| 7,277,027 B2 | 10/2007 | Ehrke et al. | 340/870.12 |
| 7,277,967 B2 | 10/2007 | Kao et al. | 710/18 |
| 7,289,887 B2 | 10/2007 | Rodgers | 700/295 |
| 7,295,128 B2 | 11/2007 | Petite | 340/628 |
| 7,301,476 B2 | 11/2007 | Shuey et al. | 340/870.03 |
| 7,304,587 B2 | 12/2007 | Boaz | 340/870.02 |
| 7,308,370 B2 | 12/2007 | Mason, Jr. et al. | 702/65 |
| 7,312,721 B2 | 12/2007 | Mason, Jr. et al. | 340/870.02 |
| 7,315,257 B2 | 1/2008 | Patterson et al. | 340/870.02 |
| 7,317,404 B2 | 1/2008 | Cumeralto et al. | 340/870.02 |
| 7,321,316 B2 | 1/2008 | Hancock et al. | 340/870.02 |
| 7,324,453 B2 | 1/2008 | Wu et al. | 370/238 |
| 7,327,998 B2 | 2/2008 | Kumar et al. | 455/405 |
| 7,346,463 B2 | 3/2008 | Petite et al. | 702/62 |
| 7,348,769 B2 | 3/2008 | Ramirez | 324/158.1 |
| 7,349,766 B2 | 3/2008 | Rodgers | 700/295 |
| 7,362,709 B1 | 4/2008 | Hui et al. | 370/237 |
| 7,366,113 B1 | 4/2008 | Chandra et al. | 370/255 |
| 7,366,191 B2 | 4/2008 | Higashiyama | 370/406 |
| 7,379,981 B2 | 5/2008 | Elliott et al. | 709/220 |
| 7,397,907 B2 | 7/2008 | Petite | 379/155 |
| 7,406,298 B2 | 7/2008 | Luglio et al. | 455/90.3 |
| 7,411,964 B2 | 8/2008 | Suemura | 370/400 |
| 7,427,927 B2 | 9/2008 | Borleske et al. | 340/870.02 |
| 6,249,516 B1 | 11/2008 | Brownrigg et al. | 370/338 |
| 7,451,019 B2 | 11/2008 | Rodgers | 700/295 |
| 7,457,273 B2 | 11/2008 | Nakanishi et al. | 370/338 |
| 7,468,661 B2 | 12/2008 | Petite et al. | 340/540 |
| 7,487,282 B2 | 2/2009 | Leach | 710/305 |
| 7,495,578 B2 | 2/2009 | Borleske | 340/870.02 |
| 7,498,873 B2 | 3/2009 | Opshaug et al. | 329/315 |
| 7,505,453 B2 | 3/2009 | Carpenter et al. | 370/352 |
| 7,512,234 B2 | 3/2009 | McDonnell et al. | 380/247 |
| 7,515,571 B2 | 4/2009 | Kwon et al. | 370/338 |
| 7,516,106 B2 | 4/2009 | Ehlers et al. | 705/412 |
| 7,522,540 B1 | 4/2009 | Maufer | 370/254 |
| 7,522,639 B1 | 4/2009 | Katz | 370/503 |
| 7,539,151 B2 | 5/2009 | Demirhan et al. | 370/254 |
| 7,545,285 B2 | 6/2009 | Shuey et al. | 340/870.02 |
| 7,546,595 B1 | 6/2009 | Wickham et al. | 717/168 |
| 7,548,826 B2 | 6/2009 | Witter et al. | 702/115 |
| 7,548,907 B2 | 6/2009 | Wall et al. | 1/1 |
| 7,554,941 B2 | 6/2009 | Ratiu et al. | 370/328 |
| 7,562,024 B2 | 7/2009 | Brooks et al. | 705/1.1 |
| 7,571,865 B2 | 8/2009 | Nicodem et al. | 236/51 |
| 7,586,420 B2 | 9/2009 | Fischer et al. | 340/635 |
| 7,599,665 B2 | 10/2009 | Sinivaara | 455/67.16 |

(56) References Cited

U.S. PATENT DOCUMENTS

| | | | |
|---|---|---|---|
| 7,602,747 B2 | 10/2009 | Maksymczuk et al. ......... 370/331 |
| 7,609,673 B2 | 10/2009 | Bergenlid et al. ............. 370/329 |
| 7,613,147 B2 | 11/2009 | Bergenlid et al. ............. 370/329 |
| 7,623,043 B2 | 11/2009 | Mizra et al. ................. 340/870.02 |
| 7,626,967 B2 | 12/2009 | Yarvis et al. ................... 370/338 |
| 7,650,425 B2 | 1/2010 | Davis et al. .................... 709/238 |
| 7,676,231 B2 | 3/2010 | Demirhan et al. ........... 455/452.1 |
| 7,680,041 B2 | 3/2010 | Johansen ...................... 370/230 |
| 7,729,496 B2 | 6/2010 | Hacigumus .................. 380/277 |
| 7,733,224 B2 | 6/2010 | Tran ............................ 340/540 |
| 7,743,224 B2 | 6/2010 | Wang ........................... 711/154 |
| 7,756,538 B2 | 7/2010 | Bonta et al. ................... 455/517 |
| 7,769,887 B1 * | 8/2010 | Bhattacharyya et al. ..... 709/238 |
| 7,788,491 B1 | 8/2010 | Dawson ....................... 713/168 |
| 7,802,245 B2 | 9/2010 | Sonnier et al. ................ 717/171 |
| 7,814,322 B2 | 10/2010 | Gurevich et al. ............. 713/171 |
| 7,818,758 B2 | 10/2010 | de Bonet et al. .............. 719/328 |
| 7,847,706 B1 | 12/2010 | Ross et al. ................... 340/12.52 |
| 8,051,415 B2 | 11/2011 | Suzuki ......................... 717/168 |
| 8,145,920 B2 * | 3/2012 | Tsai et al. ..................... 713/300 |
| 8,254,337 B2 * | 8/2012 | Zhong et al. .................. 370/332 |
| 8,352,769 B1 * | 1/2013 | Ghose et al. .................. 713/324 |
| 2001/0005368 A1 | 6/2001 | Rune ............................ 370/390 |
| 2001/0010032 A1 | 7/2001 | Ehlers et al. ................... 702/62 |
| 2001/0038342 A1 | 11/2001 | Foote ......................... 340/870.02 |
| 2001/0046879 A1 | 11/2001 | Schramm et al. ............. 455/525 |
| 2002/0012358 A1 | 1/2002 | Sato ............................. 370/466 |
| 2002/0013679 A1 | 1/2002 | Petite ............................ 702/188 |
| 2002/0031101 A1 | 3/2002 | Petite et al. ................... 370/310 |
| 2002/0051269 A1 | 5/2002 | Margalit et al. ............... 398/126 |
| 2002/0066095 A1 | 5/2002 | Yu ................................ 717/173 |
| 2002/0110118 A1 | 8/2002 | Foley .......................... 370/352 |
| 2002/0114303 A1 | 8/2002 | Crosbie et al. ................ 370/338 |
| 2002/0120569 A1 | 8/2002 | Day .............................. 705/40 |
| 2002/0174354 A1 | 11/2002 | Bel et al. ....................... 713/193 |
| 2002/0186619 A1 | 12/2002 | Reeves et al. ................. 368/47 |
| 2003/0001640 A1 | 1/2003 | Lao et al. ...................... 327/165 |
| 2003/0001754 A1 | 1/2003 | Johnson et al. ........... 340/870.02 |
| 2003/0014633 A1 | 1/2003 | Gruber ......................... 713/170 |
| 2003/0033394 A1 | 2/2003 | Stine ............................ 709/222 |
| 2003/0037268 A1 | 2/2003 | Kistler ......................... 713/310 |
| 2003/0050737 A1 | 3/2003 | Osann .......................... 700/276 |
| 2003/0112822 A1 | 6/2003 | Hong et al. ................... 370/469 |
| 2003/0117966 A1 | 6/2003 | Chen ............................ 370/255 |
| 2003/0122686 A1 | 7/2003 | Ehrke et al. ............... 340/870.02 |
| 2003/0123481 A1 | 7/2003 | Neale et al. ................... 370/466 |
| 2003/0156715 A1 | 8/2003 | Reeds, III et al. ............. 380/37 |
| 2003/0207697 A1 | 11/2003 | Shpak .......................... 455/524 |
| 2003/0229900 A1 | 12/2003 | Reisman ....................... 725/87 |
| 2003/0233201 A1 | 12/2003 | Horst et al. ................... 702/62 |
| 2004/0008663 A1 | 1/2004 | Srikrishna et al. ............ 370/351 |
| 2004/0031030 A1 | 2/2004 | Kidder et al. ................. 717/172 |
| 2004/0034773 A1 | 2/2004 | Balabine et al. .............. 713/168 |
| 2004/0039817 A1 | 2/2004 | Lee et al. ...................... 709/224 |
| 2004/0056775 A1 | 3/2004 | Crookham et al. ........... 340/825 |
| 2004/0066310 A1 | 4/2004 | Ehrke et al. .............. 340/870.02 |
| 2004/0077341 A1 | 4/2004 | Chandranmenon et al. |
| 2004/0081086 A1 | 4/2004 | Hippelainen et al. ........ 370/227 |
| 2004/0082203 A1 | 4/2004 | Logvinov et al. ............. 439/10 |
| 2004/0100953 A1 | 5/2004 | Chen et al. .................... 370/389 |
| 2004/0113810 A1 | 6/2004 | Mason, Jr. et al. ........ 340/870.02 |
| 2004/0117788 A1 | 6/2004 | Karaoguz et al. ............. 717/177 |
| 2004/0125776 A1 | 7/2004 | Haugli et al. ................. 370/338 |
| 2004/0138787 A1 | 7/2004 | Ransom et al. ............... 700/295 |
| 2004/0140908 A1 | 7/2004 | Gladwin et al. ........... 340/870.02 |
| 2004/0157613 A1 | 8/2004 | Steer et al. .................... 455/446 |
| 2004/0183687 A1 | 9/2004 | Petite et al. ................... 340/601 |
| 2004/0185845 A1 | 9/2004 | Abhishek et al. ............ 455/422.1 |
| 2004/0193329 A1 | 9/2004 | Ransom et al. ............... 700/286 |
| 2004/0210544 A1 | 10/2004 | Shuey et al. ................... 705/412 |
| 2004/0268142 A1 | 12/2004 | Karjala et al. ................. 726/15 |
| 2005/0026569 A1 | 2/2005 | Lim et al. ..................... 455/73 |
| 2005/0027859 A1 | 2/2005 | Alvisi et al. .................. 709/224 |
| 2005/0030968 A1 | 2/2005 | Rich et al. .................... 370/449 |
| 2005/0033967 A1 | 2/2005 | Morino et al. ................ 713/182 |
| 2005/0055432 A1 | 3/2005 | Rodgers ........................ 709/223 |
| 2005/0058144 A1 | 3/2005 | Ayyagari et al. .............. 370/401 |
| 2005/0065742 A1 | 3/2005 | Rodgers ........................ 702/62 |
| 2005/0122944 A1 | 6/2005 | Kwon et al. ................... 370/338 |
| 2005/0136972 A1 | 6/2005 | Smith et al. ................. 455/554.1 |
| 2005/0172024 A1 | 8/2005 | Cheifot et al. ................ 709/225 |
| 2005/0187928 A1 | 8/2005 | Byers ............................ 1/1 |
| 2005/0193390 A1 | 9/2005 | Suzuki et al. ................. 717/178 |
| 2005/0195757 A1 | 9/2005 | Kidder et al. ................. 370/278 |
| 2005/0201397 A1 | 9/2005 | Petite ............................ 370/401 |
| 2005/0228874 A1 | 10/2005 | Edgett et al. .................. 709/220 |
| 2005/0243867 A1 | 11/2005 | Petite ............................ 370/474 |
| 2005/0249113 A1 | 11/2005 | Kobayashi et al. ........... 370/219 |
| 2005/0251403 A1 | 11/2005 | Shuey .......................... 705/1 |
| 2005/0257215 A1 | 11/2005 | Denby et al. ................. 717/172 |
| 2005/0270173 A1 | 12/2005 | Boaz ......................... 340/870.02 |
| 2005/0276243 A1 | 12/2005 | Sugaya et al. ................. 370/328 |
| 2005/0286440 A1 | 12/2005 | Strutt et al. ................... 370/253 |
| 2006/0028355 A1 | 2/2006 | Patterson et al. .......... 340/870.02 |
| 2006/0055432 A1 | 3/2006 | Shimokawa et al. ............. 327/5 |
| 2006/0056363 A1 | 3/2006 | Ratiu et al. ................... 370/338 |
| 2006/0056368 A1 | 3/2006 | Ratiu et al. ................... 370/338 |
| 2006/0077906 A1 | 4/2006 | Maegawa et al. ............. 370/254 |
| 2006/0087993 A1 | 4/2006 | Sengupta et al. ............. 370/310 |
| 2006/0098576 A1 | 5/2006 | Brownrigg et al. ........... 370/238 |
| 2006/0098604 A1 | 5/2006 | Flammer, III et al. ........ 370/337 |
| 2006/0111111 A1 | 5/2006 | Ovadia ......................... 455/439 |
| 2006/0130053 A1 | 6/2006 | Buljore et al. ................ 717/173 |
| 2006/0140135 A1 | 6/2006 | Bonta et al. ................... 370/254 |
| 2006/0146717 A1 | 7/2006 | Conner et al. ................ 370/238 |
| 2006/0152344 A1 * | 7/2006 | Mowery, Jr. ............. 340/310.11 |
| 2006/0158347 A1 | 7/2006 | Roche et al. .............. 340/870.02 |
| 2006/0161310 A1 | 7/2006 | Lal .............................. 700/295 |
| 2006/0167784 A1 | 7/2006 | Hoffberg ...................... 705/37 |
| 2006/0184288 A1 | 8/2006 | Rodgers ....................... 700/295 |
| 2006/0215583 A1 | 9/2006 | Castagnoli .................... 370/254 |
| 2006/0215673 A1 | 9/2006 | Olvera-Hernandez ........ 370/406 |
| 2006/0217936 A1 | 9/2006 | Mason et al. ................. 702/188 |
| 2006/0230276 A1 | 10/2006 | Nochta ......................... 713/176 |
| 2006/0271244 A1 | 11/2006 | Cumming et al. ............ 700/291 |
| 2006/0271678 A1 | 11/2006 | Jessup et al. .................. 709/224 |
| 2007/0001868 A1 | 1/2007 | Boaz ......................... 340/870.02 |
| 2007/0013547 A1 | 1/2007 | Boaz ......................... 340/870.02 |
| 2007/0019598 A1 | 1/2007 | Prehofer ....................... 370/338 |
| 2007/0036353 A1 | 2/2007 | Reznik et al. ................. 380/30 |
| 2007/0057767 A1 | 3/2007 | Sun et al. ...................... 340/7.35 |
| 2007/0060147 A1 | 3/2007 | Shin et al. ..................... 455/445 |
| 2007/0063866 A1 | 3/2007 | Webb ......................... 340/870.02 |
| 2007/0063868 A1 | 3/2007 | Borleske ..................... 340/870.03 |
| 2007/0085700 A1 | 4/2007 | Walters et al. ............ 340/870.02 |
| 2007/0087756 A1 | 4/2007 | Hoffberg ...................... 455/450 |
| 2007/0089110 A1 | 4/2007 | Li ................................ 717/178 |
| 2007/0101442 A1 | 5/2007 | Bondurant .................... 726/34 |
| 2007/0103324 A1 | 5/2007 | Kosuge et al. ................ 340/618 |
| 2007/0109121 A1 | 5/2007 | Cohen ....................... 340/539.26 |
| 2007/0110024 A1 | 5/2007 | Meier ........................... 370/351 |
| 2007/0110080 A1 * | 5/2007 | Bennett ........................ 370/400 |
| 2007/0120705 A1 | 5/2007 | Kiiskila et al. ............ 340/870.02 |
| 2007/0136817 A1 | 6/2007 | Nguyen ........................ 726/26 |
| 2007/0139220 A1 | 6/2007 | Mirza et al. ............... 340/870.02 |
| 2007/0143046 A1 | 6/2007 | Budike, Jr. .................... 702/62 |
| 2007/0147268 A1 | 6/2007 | Kelley et al. ................. 370/254 |
| 2007/0169074 A1 | 7/2007 | Koo et al. ..................... 717/168 |
| 2007/0169075 A1 | 7/2007 | Lill et al. ...................... 717/168 |
| 2007/0169080 A1 | 7/2007 | Friedman ..................... 717/168 |
| 2007/0174467 A1 | 7/2007 | Ballou, Jr. et al. ............ 709/227 |
| 2007/0177538 A1 | 8/2007 | Christensen et al. ......... 370/328 |
| 2007/0177576 A1 | 8/2007 | Johansen et al. ............. 370/351 |
| 2007/0177613 A1 | 8/2007 | Shorty et al. ................. 370/401 |
| 2007/0189249 A1 | 8/2007 | Gurevich et al. ............. 370/338 |
| 2007/0200729 A1 | 8/2007 | Borleske et al. .......... 340/870.02 |
| 2007/0201504 A1 | 8/2007 | Christensen et al. ......... 370/437 |
| 2007/0204009 A1 | 8/2007 | Shorty et al. ................. 709/218 |
| 2007/0205915 A1 | 9/2007 | Shuey et al. ............... 340/870.02 |
| 2007/0206503 A1 | 9/2007 | Gong et al. ................... 370/238 |
| 2007/0206521 A1 | 9/2007 | Osaje ........................... 370/315 |
| 2007/0207811 A1 | 9/2007 | Das et al. ...................... 455/450 |
| 2007/0210933 A1 | 9/2007 | Leach ....................... 340/870.02 |
| 2007/0211636 A1 | 9/2007 | Bellur et al. .................. 370/238 |

(56) References Cited

U.S. PATENT DOCUMENTS

| | | | |
|---|---|---|---|
| 2007/0239477 A1 | 10/2007 | Budike, Jr. | 705/412 |
| 2007/0248047 A1 | 10/2007 | Shorty et al. | 370/329 |
| 2007/0257813 A1 | 11/2007 | Vaswani et al. | 340/870.02 |
| 2007/0258508 A1 | 11/2007 | Werb et al. | 375/140 |
| 2007/0263647 A1 | 11/2007 | Shorty et al. | 370/406 |
| 2007/0265947 A1 | 11/2007 | Schimpf et al. | 705/35 |
| 2007/0266429 A1 | 11/2007 | Ginter et al. | 726/12 |
| 2007/0271006 A1 | 11/2007 | Golden et al. | 700/295 |
| 2007/0276547 A1 | 11/2007 | Miller | 700/295 |
| 2008/0011864 A1 | 1/2008 | Tessier et al. | 236/51 |
| 2008/0018492 A1 | 1/2008 | Ehrke et al. | 340/870.03 |
| 2008/0024320 A1 | 1/2008 | Ehrke et al. | 340/870.02 |
| 2008/0031145 A1 | 2/2008 | Ethier et al. | 370/248 |
| 2008/0032703 A1 | 2/2008 | Krumm et al. | 455/456.1 |
| 2008/0037569 A1 | 2/2008 | Werb et al. | 370/406 |
| 2008/0042874 A1 | 2/2008 | Rogai | 340/870.03 |
| 2008/0046388 A1 | 2/2008 | Budike, Jr. | 705/412 |
| 2008/0048883 A1 | 2/2008 | Boaz | 340/870.02 |
| 2008/0051036 A1 | 2/2008 | Vaswani et al. | 455/69 |
| 2008/0063205 A1 | 3/2008 | Braskich et al. | 380/270 |
| 2008/0068217 A1 | 3/2008 | Van Wyk et al. | 340/870.11 |
| 2008/0068994 A1 | 3/2008 | Garrison et al. | 370/230 |
| 2008/0068996 A1 | 3/2008 | Clave et al. | 370/230.1 |
| 2008/0084330 A1* | 4/2008 | Picard | 340/870.02 |
| 2008/0086560 A1 | 4/2008 | Monier et al. | 709/224 |
| 2008/0089314 A1 | 4/2008 | Meyer et al. | 370/349 |
| 2008/0095224 A1 | 4/2008 | Picard | 375/224 |
| 2008/0097782 A1 | 4/2008 | Budike, Jr. | 705/1.1 |
| 2008/0107034 A1 | 5/2008 | Jetcheva et al. | 370/238 |
| 2008/0117110 A1 | 5/2008 | Luglio et al. | 343/702 |
| 2008/0129538 A1 | 6/2008 | Vaswani et al. | 340/870.03 |
| 2008/0130535 A1 | 6/2008 | Shorty et al. | 370/310 |
| 2008/0130562 A1 | 6/2008 | Shorty et al. | 370/329 |
| 2008/0132185 A1 | 6/2008 | Elliott et al. | 455/115.4 |
| 2008/0136667 A1 | 6/2008 | Vaswani et al. | 340/870.02 |
| 2008/0151795 A1 | 6/2008 | Shorty et al. | 370/310 |
| 2008/0151824 A1 | 6/2008 | Shorty et al. | 370/329 |
| 2008/0151825 A1 | 6/2008 | Shorty et al. | 370/329 |
| 2008/0151826 A1 | 6/2008 | Shorty et al. | 370/329 |
| 2008/0151827 A1 | 6/2008 | Shorty et al. | 370/329 |
| 2008/0154396 A1 | 6/2008 | Shorty et al. | 700/90 |
| 2008/0159213 A1 | 7/2008 | Shorty et al. | 370/329 |
| 2008/0165712 A1 | 7/2008 | Shorty et al. | 370/310 |
| 2008/0170511 A1 | 7/2008 | Shorty et al. | 370/254 |
| 2008/0177678 A1 | 7/2008 | Di Martini et al. | 705/512 |
| 2008/0180274 A1 | 7/2008 | Cumeralto et al. | 340/870.02 |
| 2008/0181133 A1 | 7/2008 | Thubert et al. | 370/255 |
| 2008/0183339 A1 | 7/2008 | Vaswani et al. | 700/297 |
| 2008/0186202 A1 | 8/2008 | Vaswani et al. | 340/870.03 |
| 2008/0186203 A1 | 8/2008 | Vaswani et al. | 340/870.11 |
| 2008/0187001 A1 | 8/2008 | Vaswani et al. | 370/466 |
| 2008/0187116 A1 | 8/2008 | Reeves et al. | 379/106.09 |
| 2008/0189415 A1 | 8/2008 | Vaswani et al. | 709/226 |
| 2008/0189436 A1 | 8/2008 | Vaswani et al. | 709/242 |
| 2008/0204272 A1 | 8/2008 | Ehrke et al. | 340/870.02 |
| 2008/0205355 A1 | 8/2008 | Liu et al. | 370/338 |
| 2008/0224891 A1 | 9/2008 | Ehrke et al. | 340/870.02 |
| 2008/0225737 A1 | 9/2008 | Gong et al. | 370/252 |
| 2008/0238714 A1 | 10/2008 | Ehrke et al. | 340/870.02 |
| 2008/0238716 A1 | 10/2008 | Ehrke et al. | 340/870.03 |
| 2008/0272934 A1 | 11/2008 | Wang et al. | 340/870.11 |
| 2008/0283620 A1 | 11/2008 | Knapp | 236/12.16 |
| 2008/0310311 A1 | 12/2008 | Flammer et al. | 370/238 |
| 2008/0310377 A1 | 12/2008 | Flammer et al. | 370/338 |
| 2008/0317047 A1 | 12/2008 | Zeng et al. | 370/401 |
| 2008/0318547 A1 | 12/2008 | Ballou, Jr. et al. | 455/410 |
| 2008/0318580 A1* | 12/2008 | Zhong et al. | 455/444 |
| 2009/0003214 A1 | 1/2009 | Vaswani et al. | 370/236 |
| 2009/0003232 A1 | 1/2009 | Vaswani et al. | 370/252 |
| 2009/0003243 A1 | 1/2009 | Vaswani et al. | 370/255 |
| 2009/0003356 A1 | 1/2009 | Vaswani et al. | 370/400 |
| 2009/0010178 A1 | 1/2009 | Tekippe | 370/254 |
| 2009/0010190 A1* | 1/2009 | Gong | 370/311 |
| 2009/0034418 A1 | 2/2009 | Flammer, III et al. | 370/238 |
| 2009/0034419 A1 | 2/2009 | Flammer, III et al. | 370/238 |
| 2009/0034432 A1 | 2/2009 | Bonta et al. | 370/255 |
| 2009/0043911 A1 | 2/2009 | Flammer et al. | 709/238 |
| 2009/0046732 A1 | 2/2009 | Pratt, Jr. et al. | 370/406 |
| 2009/0055032 A1 | 2/2009 | Rodgers | 700/295 |
| 2009/0068947 A1 | 3/2009 | Petite | 455/462 |
| 2009/0077405 A1 | 3/2009 | Johansen | 713/323 |
| 2009/0079584 A1 | 3/2009 | Grady et al. | 340/870.02 |
| 2009/0082888 A1 | 3/2009 | Johansen | 700/94 |
| 2009/0096605 A1 | 4/2009 | Petite et al. | 340/539.22 |
| 2009/0102737 A1 | 4/2009 | Birnbaum et al. | 343/828 |
| 2009/0115626 A1 | 5/2009 | Vaswani et al. | 340/870.02 |
| 2009/0129575 A1 | 5/2009 | Chakraborty et al. | 379/201.03 |
| 2009/0132220 A1 | 5/2009 | Chakraborty et al. | 703/13 |
| 2009/0134969 A1 | 5/2009 | Veillette | 340/3.1 |
| 2009/0135677 A1 | 5/2009 | Veillette | 368/47 |
| 2009/0135716 A1 | 5/2009 | Veillette | 370/221 |
| 2009/0135753 A1* | 5/2009 | Veillette | 370/311 |
| 2009/0135843 A1* | 5/2009 | Veillette | 370/406 |
| 2009/0136042 A1 | 5/2009 | Veillette | 380/279 |
| 2009/0138777 A1 | 5/2009 | Veillette | 714/748 |
| 2009/0161594 A1 | 6/2009 | Zhu et al. | 370/312 |
| 2009/0167547 A1 | 7/2009 | Gilbert | 340/662 |
| 2009/0168846 A1 | 7/2009 | Filippo, III et al. | 375/133 |
| 2009/0175238 A1 | 7/2009 | Jetcheva et al. | 370/329 |
| 2009/0179771 A1 | 7/2009 | Seal et al. | 340/870.04 |
| 2009/0201936 A1 | 8/2009 | Dumet et al. | 370/401 |
| 2009/0235246 A1 | 9/2009 | Seal et al. | 717/173 |
| 2009/0243840 A1 | 10/2009 | Petite et al. | 340/539.1 |
| 2009/0245270 A1 | 10/2009 | van Greunen et al. | 370/410 |
| 2009/0262642 A1 | 10/2009 | van Greunen et al. | 370/216 |
| 2009/0267792 A1 | 10/2009 | Crichlow | 340/870.02 |
| 2009/0285124 A1 | 11/2009 | Aguirre et al. | 370/255 |
| 2009/0296634 A1* | 12/2009 | Gupta et al. | 370/328 |
| 2009/0303972 A1 | 12/2009 | Flammer, III et al. | 370/338 |
| 2009/0310593 A1 | 12/2009 | Sheynblat et al. | 370/350 |
| 2009/0315699 A1 | 12/2009 | Satish et al. | 340/533 |
| 2009/0319672 A1 | 12/2009 | Reisman | 709/227 |
| 2009/0320073 A1 | 12/2009 | Reisman | 725/51 |
| 2010/0017249 A1 | 1/2010 | Fincham et al. | 705/412 |
| 2010/0037069 A1 | 2/2010 | Deierling et al. | 713/193 |
| 2010/0037293 A1 | 2/2010 | St. Johns et al. | 726/2 |
| 2010/0040042 A1 | 2/2010 | van Greunen et al. | 370/350 |
| 2010/0060259 A1 | 3/2010 | Vaswani et al. | 324/86 |
| 2010/0061272 A1 | 3/2010 | Veillette | 370/254 |
| 2010/0061350 A1 | 3/2010 | Flammer, III | 370/338 |
| 2010/0073193 A1 | 3/2010 | Flammer, III | 340/870.11 |
| 2010/0074176 A1 | 3/2010 | Flammer, III et al. | 370/328 |
| 2010/0074304 A1 | 3/2010 | Flammer, III | 375/134 |
| 2010/0138660 A1 | 6/2010 | Haynes et al. | 713/171 |
| 2010/0226298 A1* | 9/2010 | Chan et al. | 370/311 |
| 2010/0238917 A1 | 9/2010 | Silverman et al. | 370/350 |
| 2010/0256830 A1 | 10/2010 | Kressner et al. | 700/291 |
| 2011/0004358 A1 | 1/2011 | Pollack et al. | 700/297 |
| 2011/0035073 A1 | 2/2011 | Ozog | 700/291 |
| 2011/0066297 A1 | 3/2011 | Saberi et al. | 700/287 |
| 2011/0110309 A1* | 5/2011 | Bennett | 370/328 |
| 2012/0229296 A1* | 9/2012 | Ree | 340/870.02 |
| 2012/0268291 A1* | 10/2012 | Boot et al. | 340/870.03 |
| 2012/0316691 A1* | 12/2012 | Boardman et al. | 700/293 |
| 2013/0003746 A1* | 1/2013 | Klein et al. | 370/401 |
| 2013/0090116 A1* | 4/2013 | Lim | 455/434 |

FOREIGN PATENT DOCUMENTS

| | | | | |
|---|---|---|---|---|
| EP | 0 812 502 B1 | | 8/2004 | H04L 12/28 |
| EP | 0 740 873 B1 | | 12/2005 | H04L 12/44 |
| JP | 10-070774 | | 3/1998 | H04Q 5/00 |
| JP | 10-135965 | | 5/1998 | H04L 12/28 |
| WO | WO 95/12942 | | 5/1995 | H04L 12/44 |
| WO | WO 96/10307 | | 4/1996 | H04L 12/28 |
| WO | WO 96/10307 | A1 | 4/1996 | H04L 12/28 |
| WO | WO 00/54237 | | 9/2000 | G08B 23/00 |
| WO | WO 01/26334 | A2 | 4/2001 | H04L 29/06 |
| WO | WO 01/55865 | A1 | 8/2001 | G06F 13/00 |
| WO | WO 03/015452 | | 2/2003 | H04Q 9/00 |
| WO | WO 2005/091303 | | 9/2005 | G06F 9/445 |
| WO | WO 2006/059195 | | 6/2006 | G05D 3/12 |
| WO | WO 2007/015822 | | 8/2007 | H04L 12/28 |
| WO | WO 2007/132473 | | 11/2007 | G08C 17/00 |

(56) References Cited

FOREIGN PATENT DOCUMENTS

| WO | WO 2008/027457 | 3/2008 | ............ G08B 23/00 |
|----|----------------|--------|-------------------------|
| WO | WO 2008/033287 A2 | 3/2008 | ............ G08B 23/00 |
| WO | WO 2008/033514 A2 | 3/2008 | ............ G08B 25/00 |
| WO | WO 2008/038072 | 4/2008 | ............ H04Q 7/24 |
| WO | WO 2008/092268 A1 | 8/2008 | ............ G01D 7/06 |
| WO | WO 2009/067251 | 5/2009 | ............ G08C 19/00 |

OTHER PUBLICATIONS

Hydro One Networks, Inc., Request for Proposal for Smart Metering Services, 16 pp., Mar. 4, 2005.
Trilliant Networks, "The Trilliant AMI Solution," RFP SCP-07003, 50 pp., Mar. 22, 2007.
"ZigBee Smart Energy Profile Specification," ZigBee Profile 0x0109, Revision 14, Document 075356r14, 202 pp., May 29, 2008.
Hubaux, J. P., et al. "Towards Mobile Ad-Hoc WANs: Terminodes," 2000 IEEE, Wireless Communications and Networking Conference, WCNC, vol. 3, pp. 1052-1059, 2000.
Miklos, G., et al., "Performance Aspects of Bluetooth Scatternet Formation," First Annual Workshop on Mobile and Ad Hoc Networking and Computing, MobiHOC 2000, pp. 147-148, 2000.
Eng, K. Y., et al. "BAHAMA: A Broadband Ad-Hoc Wireless ATM Local-Area Network," 1995 IEEE International Conference on Communications, ICC '95 Seattle, 'Gateway to Globalization', vol. 2, pp. 1216-1223, Jun. 18-22, 1995.
Lee, David J. Y., "Ricocheting Bluetooth," 2nd International Conference on Microwave and Millimeter Wave Technology Proceedings, ICMMT 2000, pp. 432-435, 2000.
Lilja, Tore, "Mobile Energy Supervision," Twenty-second International Telecommunications Energy Conference, 2000 INTELEC, pp. 707-712, 2000.
Parkka, Juha, et al., "A Wireless Wellness Monitor for Personal Weight Management," Proceedings of the 2000 IEEE EMBS International Conference on Information Technology Applications in Biomedicine, pp. 83-88, 2000.
Broch, J., et al., "Supporting Hierarchy and Heterogeneous Interfaces in Multi-Hop Wireless Ad Hoc Networks," Proceedings of the Fourth International Symposium on Parallel Architectures, Algorithms, and Networks (I-SPAN '99), pp. 370-375 (7 pp. with Abstract), Jun. 23-25, 1999.
Privat, G., "A System-Architecture Viewpoint on Smart Networked Devices," Microelectronic Engineering, vol. 54, Nos. 1-2, pp. 193-197, Dec. 2000.
Jonsson, U., et al., "MIPMANET-Mobile IP for Mobile Ad Hoc Networks," MobiHOC 2000, First Annual Workshop on Mobile and Ad Hoc Networking and Computing, pp. 75-85 (12 pp. with Abstract), 2000.
Kapoor, R., et al., "Multimedia Support Over Bluetooth Piconets," First Workshop on Wireless Mobile Internet, pp. 50-55, Jul. 2001.
Sung-Yuan, K., "The Embedded Bluetooth CCD Camera," TENCON, Proceedings of the IEEE Region 10 International Conference on Electrical and Electronic Technology, vol. 1, pp. 81-84 (5 pp. with Abstract), Aug. 19-22, 2001.
Lim, A., "Distributed Services for Information Dissemination in Self-Organizing Sensor Networks," Journal of the Franklin Institute, vol. 338, No. 6, pp. 707-727, Sep. 2001.
Meguerdichian, S., et al., "Localized Algorithms in Wireless Ad-Hoc Networks: Location Discovery and Sensor Exposure," ACM Symposium on Mobile Ad Hoc Networking & Computing, MobiHOC 2001, pp. 106-116, Oct. 2001.
Lilakiatsakun, W., et al. "Wireless Home Networks Based on a Hierarchical Bluetooth Scatternet Architecture," Proceedings of the Ninth IEEE International Conference on Networks, pp. 481-485 (6 pp. with Abstract), Oct. 2001.
Jha, S., et al., "Universal Network of Small Wireless Operators (UNSWo)," Proceedings of the First IEEE/ACM International Symposium on Cluster Computing and the Grid, pp. 626-631 (7 pp. with Abstract), 2001.

"AMRON Technologies Successfully Deploys Advanced Metering Solution for C&I Customers Using Bluetooth" [online], Sep. 2, 2004 [retrieved on Jan. 2, 2009], 3 pp., Retrieved from the Internet: http://www.techweb.com/showpressrelease?articleId=X234101&CompanyId=3.
Utility Intelligence, "Exclusive Distributors of Dynamic Virtual Metering" [online], Copyright 2004-2005 [retrieved on May 12, 2005], Retrieved from the Internet: http://www.empoweringutilities.com/hardware.html, 29 pp.
"AMRON Meter Management System" [online], [retrieved on May 12, 2005], 41 pp., Retrieved from the Internet: http://www.amronm5.com/products/.
Reexamination Application No. 90/008,011, filed Jul. 24, 2006, 75 pp.
Broch, Josh, et al., "A Performance Comparison of Multi-Hop Wireless Ad Hoc Network Routing Protocols," *Proceedings of the Fourth Annual ACM/IEEE International Conference in Mobile Computing and Networking (MobiCom '98)*, Dallas, Texas, 13 pp., Oct. 25-30, 1998.
Broch, Josh, et al., "The Dynamic Source Routing Protocol for Mobile Ad Hoc Networks" [online], Mar. 13, 1998 [retrieved on Feb. 24, 2009], 31 pp., Retrieved from the Internet: http://tools.ietf.org/draft-ietf.org/draft-ietf-manet-dsr-00.txt.
Katz, Randy H. and Brewer, Eric A., "The Case for Wireless Overlay Networks," *Electrical Engineering and Computer Science Department, University of California*, Berkeley, 12 pp., 1996.
Johnson, David B., "Routing in Ad Hoc Networks of Mobile Hosts," *IEEE*, pp. 158-163, 1995.
Nachum Shacham, Edwin B. Brownrigg, & Clifford A. Lynch, *A Packet Radio Network For Library Automation*, 1987 IEEE Military Communications Conference, vol. 2 at 21.3.1, (Oct. 1987).
Nachum Shacham & Janet D. Tornow, Future Directions in Packet Radio Technology, Proc. of the IEEE Infocom 1985 at 93 (Mar. 1985). 17 pp.
John Jubin & Janet D. Tornow, The DARPA Packet Radio Network Protocols, Proc. of the IEEE, vol. 75, No. 1 at 21 (Jan. 1987).
John Jubin, Current Packet Radio Network Protocols, Proc. of the IEEE Infocom1985 at 86 (Mar. 1985), 9 pp.
David B. Johnson & David A. Maltz, Dynamic Source Routing in Ad Hoc Wireless Networks, reprinted in Mobile Computing, 153, Kluwer Academic Publishers (Tomasz Imielinski & Henry F. Korth eds., 1996), 18 pp.
David B. Johnson, Mobile Host Internetworking Using IP Loose Source Routing, Carnegie Mellon University CMU-CS-93-128, DARPA Order No. 7330 (Feb. 1993), 18 pp.
Daniel M. Frank, Transmission of IP Datagrams Over NET/ROM Networks, Proc. of the ARRL 7th Computer Networking Conference 1988 at 65 (Oct. 1988), 6 pp.
Robert E. Kahn, et al., Advances in Packet Radio Technology, Proc. of the IEEE, vol. 66, No. 11, pp. 1468-1496 (Nov. 1978).
Clifford A. Lynch & Edwin B. Brownrigg, Packet Radio Networks, Bergamon Press, 259-74 (1987).
Charles E. Perkins & Pravin Bhagwat, Highly Dynamic Destination-Sequenced Distance-Vector Routing (DSDV) for Mobile Computers, ACM SIGCOMM Computer Communication Review, vol. 24, Issue 4 at 234 (Oct. 1994), 11 pp.
William MacGregor, Jil Westcott, & Michael Beeler, Multiple Control Stations in Packet Radio Networks, 1982 IEEE Military Communications Conference, vol. 3 at 10.3-1 (Oct. 1982), 6 pp.
Nachum Shacham & Jil Westcott, Future Directions in Packet Radio Architectures and Protocols, Proc. of the IEEE, vol. 75, No. 1 at 83 (Jan. 1987), 17 pp.
David B. Johnson and David A. Maltz, Protocols for Adaptive Wireless and Mobile Networking, IEEE Personal Communications, Feb. 1996, p. 34-42.
Arek J. Dadej and Daniel Floreani, Interconnected Mobile Radio Networks—A step Towards Integrated Multimedia Military Communications, Communications and Networks for the Year 2000, IEEE Singapore International Conference on Networks/International Conference on Information Engineering '93, vol. 1, p. 152-156.
David A. Beyer, Accomplishments of the DARPA SURAN Program, IEEE MILCOM 1990, p. 39.6.1-8.

(56) References Cited

OTHER PUBLICATIONS

William S. Hortos, Application of Neural Networks to the Dynamic Spatial Distribution of Nodes within an Urban Wireless Network, SPIE, vol. 2492, p. 58-70, 1995.

Nachum Shacham and Richard G. Ogier, Network Control and Data Transport for C3I Applications, IEEE 1987, p. 30.5.1-6.

John E. Rustad, Reidar Skaug, and Andreas Aasen, New Radio Networks for Tactical Communication, IEEE Jornal on Selected Areas in Communications, vol. 8, No. 5, p. 713-27, Jun. 1990.

Barry M. Leiner, Donald L. Nielson, and Fouad A. Tobagi, Issues in Packet Radio Network Design, Proceedings of the IEEE, vol. 75, No. 1, p. 6-20, Jan. 1987.

Janet Tornow, Functional Summary of the DARPA SURAP1 Network, DARPA, Sep. 1986, 17 pp.

John F. Shoch and Lawrence Stewart, Interconnecting Local Networks via the Packet Radio Network, Sixth Data Communications Symposium, Nov. 1979, pp. 153-158.

J.R. Cleveland, Performance and Design Considerations for Mobile Mesh Networks, IEEE MILCOM 96, vol. 1, p. 245-49.

Cmdr. R. E. Bruninga, USN, A Worldwide Packet Radio Network, Signal, vol. 42, No. 10, p. 221-230, Jun. 1988.

Nachum Shacham and Janet Tornow, Packet Radio Networking, Telecommunications, vol. 20, No. 9, p. 42-48, 64, 82, Sep. 1986.

Spencer T. Carlisle, Edison's NetComm Project, IEEE 1989, Paper No. 89CH2709-4-B5, p. B5-1-B5-4.

Brian H. Davies and T.R. Davies, The Application of Packet Switching Techniques to Combat Net Radio, Proceedings of the IEEE, vol. 75, No. 1, p. 43-55, Jan. 1987.

Fouad A. Tobagi, Richard Binder, and Barry Leiner, Packet Radio and Satellite Networks, IEEE Communications Magazine, vol. 22, No. 11, p. 24-40, Nov. 1984.

M. Scott Corson, Joseph Macker, and Stephen G. Batsell, Architectural Considerations for Mobile Mesh Networking, IEEE MILCOM 96, vol. 1, p. 225-9.

K.Y. Eng, et. al., Bahama: A Broadband Ad-Hoc Wireless ATM Local-Area Network, 1995 IEEE International Conference on Communications, vol. 2, p. 1216-23, Jun. 18-22, 1995.

J. Jonquin Garcia-Luna-Aceves, A Fail-Safe Routing Algorithm for Multihop Packet-Radio Networks, IEEE INFOCOM '86, p. 434-43, Apr. 8-10, 1986.

Johanes P. Tamtomo, A Prototype of TCP/IP-Based Internet-PRNET for Land Information Networks and Services, Department of Surveying Engineering, University of New Brunswick, Jan. 25, 1993, 118 pp.

A. Alwan, et al., Adaptive Mobile Multimedia Networks, IEEE Personal Communications, p. 34-51, Apr. 1996.

Michael Ball, et al., *Reliability of Packet Switching Broadcast Radio Networks*, IEEE Transactions on Circuits and Systems, vol. Cas-23, No. 12, p. 806-13, Dec. 1976.

Kenneth Brayer, Implementation and Performance of Survivable Computer Communication with Autonomous Decentralized Control, IEEE Communications Magazine, p. 34-41, Jul. 1983.

Weidong Chen and Eric Lin, *Route Optimization and Locations Updates for Mobile Hosts*, Proceedings of the 16th ICDCS, p. 319-326, 1996.

Daniel Cohen, Jonathan B. Postel, and Raphael Rom, *IP Addressing and Routing in a Local Wireless Network*, IEEE INFOCOM 1992, p. 5A.3.1-7.

Charles Perkins and David B. Johnson, *Mobility Support in IPv6*, Sep. 22, 1994, http//www.monarch.cs.rice.edu/internet-drafts/draft-perkins-ipv6-mobility-sup-00.txt (last visited Sep. 26, 2009.

Jonathan J. Hahn and David M. Stolle, *Packet Radio Network Routing Algorithms: A Survey*, IEEE Communications Magazine, vol. 22, No. 11, p. 41-7, Nov. 1984.

David A. Hall, *Tactical Internet System Architecture for the Task Force XXI*, IEEE 1996, p. 219-30.

Robert Hinden and Alan Sheltzer, *The DARPA Internet Gateway*, DARPA RFC 823, Sep. 1982, 45 pp.

Manuel Jimenez-Cedeno and Ramon Vasquez-Espinosa, *Centralized Packet Radio Network: A Communication Approach Suited for Data Collection in a Real-Time Flash Flood Prediction System*, Dept. of Electrical and Computer Engineering, University of Puerto Rico-Mayaguez, ACM 0-89791-568-2/93, p. 709-13, 1993.

David B. Johnson, *Routing in Ad Hoc Networks of Mobile Hosts*, Workshop on Mobile Computing Systems and Applications, Dec. 8-9, 1994, Santa Cruz, California, IEEE 1995, p. 158-63.

David B. Johnson, *Route Optimization in Mobile IP*, Nov. 28, 1994, http://www.monarch.cs.rice.edu/internet-drafts/draft-ietf-mobileip-optim-00.txt (last visited Sep. 26, 2009), 32 pp.

Mark G. Lewis and J.J. Garcia-Luna-Aceves, *Packet-Switching Applique for Tactical VHF Radios*, 1987 IEEE MILCOM Communciations Conference, Oct. 19-22, 1987, Washington, D.C., p. 21.2.1-7.

Sioe Mak and Denny Radford, *Design Considerations for Implementation of Large Scale Automatic Meter Reading Systems*, IEEE Transactions on Power Delivery, vol. 10, No. 1, p. 97-103, Jan. 1995.

Charles E. Perkins and Pravin Bhagwat, *A Mobile Networking System Based on Internet Protocol*, IEEE Personal Communications, First Quarter 1994, IEEE 1994, p. 32-41.

Richard Schulman, Richard Snyder, and Larry J. Williams, *SINGCARS Internet Controller-Heart of the Digitized Battlefield*, Proceedings of the 1996 Tactical Communications Conference, Apr. 30-May 2, 1996, Fort Wayne, Indiana, p. 417-21.

Nachum Shacham and Earl J. Craighill, *Dynamic Routing for Real-Time Data Transport in Packet Radio Networks*, Proceedings of INFOCOM 1982, IEEE 1982, p. 152-58.

R. Lee Hamilton, Jr. and Hsien-Chuen Yu, *Optimal Routing in Multihop Packet Radio Networks*, IEEE 1990, p. 389-96.

Carl A. Sunshine, *Addressing Problems in Multi-Network Systems*, Proceedings of INFOCOM 1982, IEEE 1982, p. 12-18.

J.J. Garcia-Luna-Aceves, *Routing Management in Very Large-Scale Networks*, North-Holland, Future Generations Computer Systems 4, 1988, pp. 81-93.

J.J. Garcia-Luna-Aceves, *A Minimum-hop Routing Algorithm Based on Distributed Information*, North-Holland, Computer Networks and ISDN Systems 16, 1988/89, p. 367-382.

D. Hubner, J. Kassubek, F. Reichert, *A Distributed Multihop Protocol for Mobile Stations to Contact a Stationary Infrastructure*, Third IEE Conference on Telecommunications, Conference Publication No. 331, p. 204-7.

Jens Zander and Robert Forchheimer, *The SOFTNET Project: A Retrospect*, IEEE EUROCON, Jun. 13-17, 1988, p. 343-5.

Mario Gerla and Jack Tzu-Chich Tsai, *Multicluster, Mobile, Multimedia Radio Network*, Wireless Networks 1, J.C. Baltzer AG, Science Publishers, 1995, p. 255-265.

F. G. Harrison, *Microwave Radio in the British TeleCom Access Network*, Second IEE National Conference on Telecommunications, Conference Publication No. 300, Apr. 2-5, 1989, p. 208-13.

Chai-Keong Toh, *A Novel Distributed Routing Protocol to Support Ad-Hoc Mobile Computing*, Conference Proceedings of the 1996 IEEE Fifteenth Annual International Phoenix Conference on Computers and Communications, Mar. 27-29, 1996, p. 480-6.

Fadi F. Wahhab, *Multi-Path Routing Protocol for Rapidly Deployable Radio Networks*, Thesis submitted to the Department of Electrical Engineering and Computer Science of the University of Kansas, 1994, 59 pp.

Jil Westcott and Gregory Lauer, *Hierarchical Routing for Very Large Networks*, IEEE MILCOM 1984, Oct. 21-24, 1984, Conference Record vol. 2, p. 214-8.

International Search Report and Written Opinion for Application No. PCT/US08/13027, dated Feb. 9, 2009, 6 pp.

International Search Report and Written Opinion for Application No. PCT/US08/13023, dated Jan. 12, 2009, 10 pp.

International Search Report and Written Opinion for Application No. PCT/US08/13019, dated Jan. 12, 2009, 13 pp.

International Search Report and Written Opinion for Application No. PCT/US08/13025, dated Jan. 13, 2009, 7 pp.

International Search Report and Written Opinion for Application No. PCT/US08/13018, dated Jan. 30, 2009, 9 pp.

International Search Report and Written Opinion for Application No. PCT/US08/13020, dated Jan. 9, 2009, 8 pp.

International Search Report and Written Opinion for Application No. PCT/US08/13028, dated Jan. 15, 2009, 9 pp.

(56) References Cited

OTHER PUBLICATIONS

International Search Report and Written Opinion for Application No. PCT/US08/13021, dated Jan. 15, 2009, 11 pp.
International Search Report and Written Opinion for Application No. PCT/US08/13016, dated Jan. 9, 2009, 7 pp.
International Search Report and Written Opinion for Application No. PCT/US08/13024, dated Jan. 13, 2009, 9 pp.
International Search Report and Written Opinion for Application No. PCT/US08/13022, dated Jan. 27, 2009, 10 pp.
International Search Report and Written Opinion for Application No. PCT/US08/13030, dated Jan. 9, 2009, 7 pp.
International Search Report and Written Opinion for Application No. PCT/US08/12161, dated Mar. 2, 2009, 13 pp.
International Search Report and Written Opinion for Application No. PCT/US08/13017, dated Mar. 18, 2009, 11 pp.
International Search Report and Written Opinion for Application No. PCT/US08/13026, dated Feb. 24, 2009, 9 pp.
International Search Report and Written Opinion for Application No. PCT/US08/13029, dated Feb. 2, 2009, 8 pp.
International Search Report and Written Opinion for Application No. PCT/US08/13032, dated May 12, 2009, 14 pp.
International Search Report and Written Opinion for Application No. PCT/US09/05008, dated Oct. 22, 2009, 8 pp.
Leis, John, "TCP/IP Protocol Family," pp. 1 and 42-43, Apr. 3, 2006.
Supplementary European Search Report for Application No. EP 08 85 1869, dated Dec. 30, 2010, 7 pp.
International Search Report and Written Opinion for Application No. PCT/US10/26956, dated May 19, 2010, 2 pp.
Supplementary European Search Report for Application No. EP 08 85 1132, dated Dec. 6, 2010, 9 pp.
Baumann, R., et al., "Routing Packets Into Wireless Mesh Networks," *Wireless and Mobile Computing, Networking and Communications*, 2007, WIMOB 2007, Third IEEE International Conference, Piscataway, NJ, Oct. 8, 2007, p. 38 (XP031338321).
Levis Stanford University, J. P. Vasseur, Cisco Systems, et al., "Overview of Existing Routing Protocols for Low Power and Lossy Networks," draft-levis-rl2n-overview-protocols-02.txt, IETF Standard-Working-Draft, Internet Engineering Task Force, IETF, Ch, No. 2, Nov. 17, 2007 (XP015054252) (ISSN: 0000-0004).
Culler Arch Rock, J.P. Vasseur, Cisco Systems, et al., "Routing Requirements for Low Power and Lossy Networks, draft-culler-rl2n-routing-reqs-01.txt," IETF Standard-Working-Draft, Internet Engineering Task Force, IETF, CH, No. 1, Jul. 7, 2007 (XP015050851) (ISSN: 000-0004).
Perkins, C. E., et al., "Ad Hoc On-Demand Distance Vector (AODV) Routing," Network Working Group Internet Draft, XX, Nov. 9, 2001 (XP002950167).
Postel, J., "RFC 793 Transmission Control Protocol," Sep. 1981 [retrieved on Jan. 1, 2007], Retrieved From the Internet: http://www.ietf.org/rfc/rfc0793.txt.
Supplementary European Search Report for Application No. EP 08 85 1927, dated Dec. 22, 2010, 10 pp.
Younis, M., et al., "Energy-Aware Routing in Cluster-Based Sensor Networks,"Modeling, Analysis and Simulation of Computer and Telecommunications Systems, 10$^{th}$ IEEE Proceedings on Mascots, Oct. 11-16, 2002, Piscataway, NJ (XP010624424) (ISNB: 978-0-7695-1840-4).
Supplementary European Search Report for Application No. EP 08 85 3052, dated Mar. 18, 2011, 10 pp.
Supplementary European Search Report for Application No. EP 08 85 1560, dated Mar. 24, 2011, 9 pp.
Supplementary European Search Report for Application No. EP 08 85 2992, dated Mar. 23, 2011, 6 pp.
International Search Report and Written Opinion for Application No. PCT/US2011/060694, dated Apr. 9, 2012, 10 pp.
International Search Report and Written Opinion for Application No. PCT/US2011/049227, dated Jan. 31, 2012, 9 pp.
International Search Report and Written Opinion for Application No. PCT/US12/22334, dated Apr. 9, 2012, 9 pp.
International Search Report and Written Opinion for Application No. PCT/US11/56620, dated Mar. 13, 2012, 8 pp.
Supplementary European Search Report for Application No. EP 08 84 2449, dated Nov. 29, 2011, 5 pp.
Lin, Shen, et al., "A Wireless Network Based on the Combination of Zigbee and GPRS" [online], [retrieved on Feb. 16, 2012], IEEE International Conference on Networking, Sensing and Control, Apr. 6-8, 2008, 4 pp., Retrieved From the Internet: http://ieeexplore.ieee.org/xpls/abs_all.jsp?arnumber=4525223.
Telegesis, "ZigBee Gateway Makes Your Meter Smart" [online], 2005 [retrieved on Feb. 16, 2012], 1 p., Retrieved From the Internet: http://www.telegesis.com/downloads/general/SSV%20IP%20gateway%20case%20study.pdf.
Supplementary European Search Report for Application No. EP 09 81 1849, dated Dec. 13, 2011, 9 pp.
Gerla, Mario, et al., Multicasting Protocols for High-Speed, Wormhole-Routing Local Area Networks, ACM SIGCOMM Computer Communication Review, vol. 26, No. 4, Oct. 4, 1996, pp. 184-193.
International Search Report and Written Opinion for Application No. PCT/US2011/049277, dated Jan. 31, 2012, 9 pp.
International Search Report and Written Opinion for Application No. PCT/US11/21167, dated Mar. 21, 2012, 8 pp.
"UCAIug Home Area Network System Requirements Specification, A Work Product of the OpenHAN Task Force Formed by the SG Systems Working Group Under the Open Smart Grid (OpenSG) Technical Committee of the UCA® International Users Group, Version 2.0," 157 pp., Aug. 30, 2010.
"ZigBee Smart Energy Profile Specification," ZigBee Profile: 0x0109, Revision 15, Dec. 1, 2008, Document 075345r15 (SEP Document), 244 pp.
Edison Electric Institute (EEI), "Uniform Business Practices for Unbundled Electricity Metering, Volume Two," Dec. 5, 2000, 196 pp., www.naesb.org/pdf/ubp120500.pdf.
"ZigBee Smart Energy Profile Specification," ZigBee Profile: 0x0109, Revision 16, Version 1.1, Document 075356r16ZB, 332 pp., Mar. 23, 2011.
"ZigBee Over-the-Air Upgrading Cluster," ZigBee Alliance, Document 095264r18, Revision 18, Version 1.0, 63 pp., Mar. 14, 2010.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (WPANs)," IEEE Computer Society, 323 pp., Sep. 8, 2006.
IEEE Standard for Information Technology—Telecommunications and Information Exchange Between Systems—Local and Metropolitan Area Networks—Specific Requirements, "Part 15.4: Wireless Medium Access Control (MAC) and Physical Layer (PHY) Specifications for Low-Rate Wireless Personal Area Networks (LR-WPANs)," IEEE Computer Society, 679 pp., Oct. 1, 2003.
"ZigBee Cluster Library Specification," ZigBee Alliance, Document 075123r02ZB, 420 pp., May 29, 2008.
Liu, Ryan, et al., "A Survey of PEV Impacts on Electric Utilities," *EEE PES Innovative Smart Grid Technologies Conference*, Anaheim, California, 8 pp., Jan. 17-19, 2011.
"Utility/Lab Workshop on PV Technology and Systems," DTE Energy DER Technology Adoption, DEW Analysis of Renewable, PEV & Storage, Tempe, Arizona, 36 pp., Nov. 8-9, 2010.
"Network Device: Gateway Specification," ZigBee Alliance, ZigBee Document 075468r35, Revision 35, Version No. 1.0, 301 pp., Mar. 23, 2011.
International Search Report and Written Opinion for Application No. PCT/US12/28135, dated Jul. 5, 2012, 7 pp.

* cited by examiner

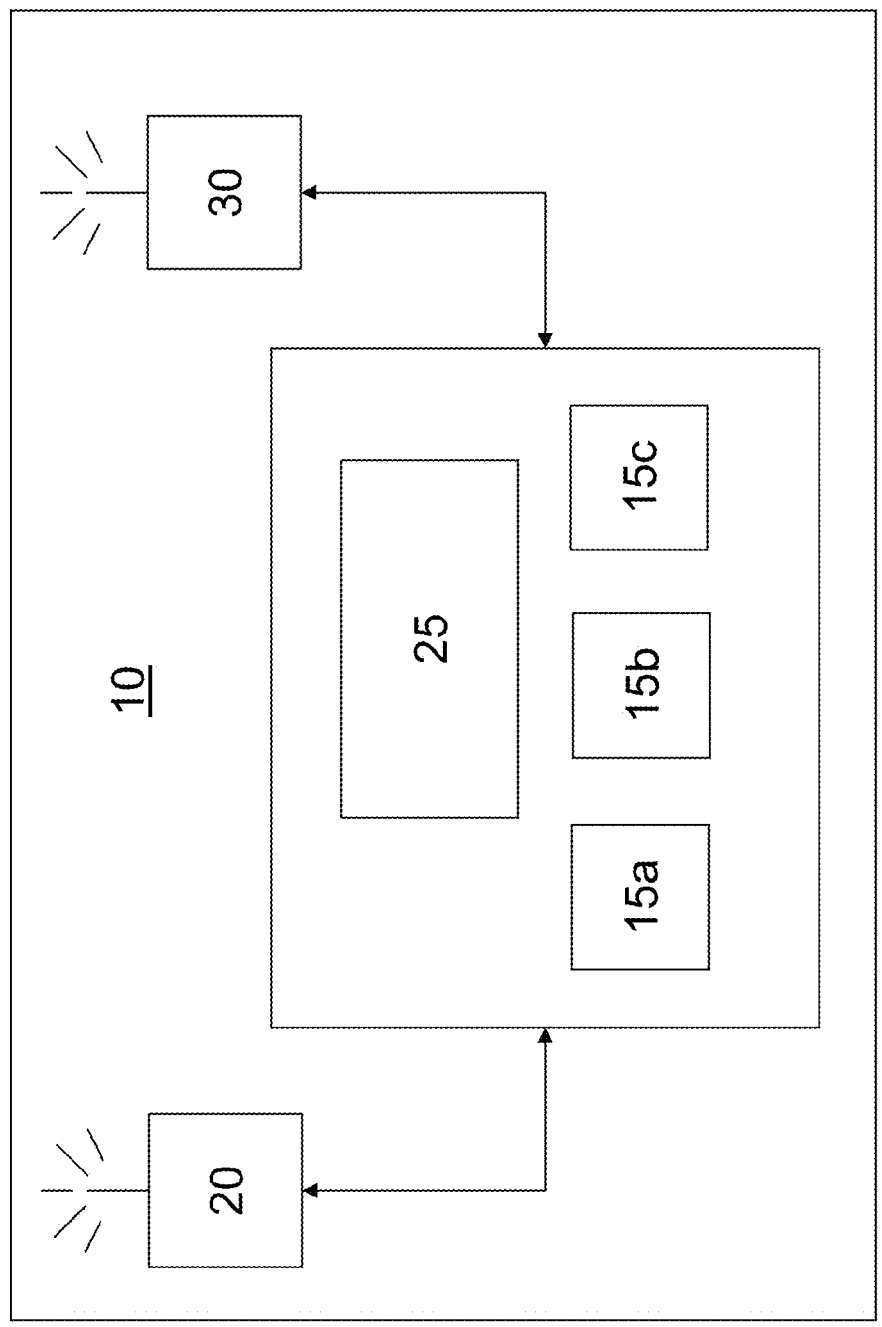

SYSTEM AND METHOD FOR IMPLEMENTING HANDOVER OF A HYBRID COMMUNICATIONS MODULE

CROSS-REFERENCE TO RELATED APPLICATIONS

The present application claims benefit of earlier filed U.S. Provisional Patent Application No. 61/536,846 filed Sep. 20, 2011 entitled SYSTEM AND METHOD FOR IMPLEMENTING A HYBRID COMMUNICATIONS MODULE which is incorporated herein by reference in its entirety.

FIELD OF THE EMBODIMENTS

The embodiments described herein are generally directed to a systems and methods that include a communications module capable of facilitating communication in residential cell meter mode, mesh network mode and wired mode.

DESCRIPTION OF RELATED ART

The present invention relates to smart grid technology. A smart grid could be defined to include multiple networks including: home area network (HAN) which is inside a home or business and connects in-premise smart devices (e.g., thermostats, appliances) to a smart meter; short range neighborhood area networks (NANs) that connect neighborhoods of smart meters and in-premise smart devices together; and "backhaul" wide-area networks (WANs) to carry that collected data back to the utility. There are numerous technologies that have been implemented to carry out the communication within and between the HAN, NAN and WAN.

Two predominant communications technologies in use today as part of the NAN and WAN are cellular and wireless mesh. Cellular was an obvious choice for implementing NAN and WAN communications because of the preexisting cellular infrastructure and relatively wide coverage. One significant drawback is the exponential cost for large scale installations. In addition to costs associated with using the cell services, coverage can be spotty especially in challenging terrain such as valleys, isolated mountaintops, and among variable cityscape structures and landscapes and would require additional infrastructure and all of the bureaucracy that goes along with placement of new cell towers. Further, utilities do not have control of the infrastructure and are at the whim of the telecommunications providers and their decisions regarding repair, replacement, pricing etc. Finally, there are privacy concerns with delivering energy data over public cellular networks. Accordingly, while cellular networks offer an immediate solution for communication of data from smart meters or collectors back to utilities, this solution may not be optimal for all situations and many utilities are looking to implement other solutions.

As an alternative or addition to cellular, many U.S. utilities are in the process of, plan to or have implemented wireless mesh systems for their smart grids. Wireless mesh can collect information from thousands of neighborhood households and connect them to a utility's Wide Area Network (WAN). Wireless mesh has some distinct advantages over cellular including: the ability to be layered atop legacy grid elements to increase two-way communications capabilities and distributed intelligence; support of mobile devices and applications for servicing nodes, e.g., meters; and utility control of security and communications quality of service. A wireless mesh system, however, requires that there be adequate node density to facilitate communications between nodes and support failover. An extension of the wireless mesh may include WiMAX configurations for extending access across longer ranges.

Finally, wired solutions, e.g., power line communications (PLC), also continue to be used for communications to and from nodes in a metering network. The existing infrastructure makes PLC ideal for facilitating communication to and from rural or remote areas where cellular and wireless solutions may not be viable or in locations or communities where concerns, i.e., publicly voiced or government mandated, as to health related issues stemming from wireless technology call for reliance on PLC or other wired solutions instead of wireless solutions.

Accordingly, there is a need in the art for a system and method that facilitates switching to or between cellular, wired, and wireless mesh networks to optimize data communication over the Neighborhood Area Network (NAN) and/or WAN. More particularly, as the smart grid industry continues to evolve, such a switching system and method may be implemented as part of a hybrid smart grid, i.e., a smart grid network where multiple communications options are available to facilitate uninterrupted monitoring and transition from one network to the other.

SUMMARY

In a first exemplary embodiment, a process for switching to or between multiple networks to optimize communication between an energy device in proximity to at least one of the multiple networks and a head end server to facilitate communication of energy-related data therebetween is described. The process includes: receiving instructions at a communications module to switch communications to or from the energy device associated with the communications module from a first network to a second network; and instructing by the communications module a first transceiver of a first network to cease communications with the energy device and instructing a second transceiver of a second network to initiate communications with the energy device to facilitate communication of energy-related data to or from the energy device and the head end server.

In a second exemplary embodiment, a process for switching to or between multiple networks to optimize communication between multiple energy devices in proximity to at least one of the multiple networks and a head end server to facilitate communication of energy-related data therebetween is described. The process includes: receiving instructions at a communications module to switch communications to or from the multiple energy devices associated with the communications module from a first network to a second network; and instructing by the communications module a first transceiver of a first network to cease communications with the multiple energy devices and instructing a second transceiver of a second network to initiate communications with the multiple energy devices to facilitate communication of energy-related data to or from the multiple energy devices and the head end server.

In a third exemplary embodiment, a system for switching to or between multiple networks to optimize communication of energy-related data is described. The system includes: a communications module including a first submodule controlling a first transceiver for communicating with a first network using a first network protocol, a second submodule controlling a second transceiver for communicating with a second network using a second network protocol; an energy device associated with the communications module, wherein the energy device tracks energy-related data that is available to the communications module for communications thereby; and a server for receiving energy-related data from the communications module via at least one of the first and second networks.

In a fourth exemplary embodiment, a communications module for switching to or between multiple networks to optimize communication of energy-related data to and from an energy device associated with the communications module is described. The communications module includes: a first submodule controlling a first transceiver for communicating the energy-related data via a first network using a first network protocol when a first predetermined condition is met; and a second submodule controlling a second transceiver for communicating energy-related data via a second network using a second network protocol when a first predetermined condition is met.

BRIEF DESCRIPTION OF THE FIGURES

The following figures are considered to be part of the disclosure and are to be considered in conjunction with the descriptions herein.

FIG. 2 illustrates an exemplary communications module in accordance with embodiments herein.

DETAILED DESCRIPTION

Figure 1B:
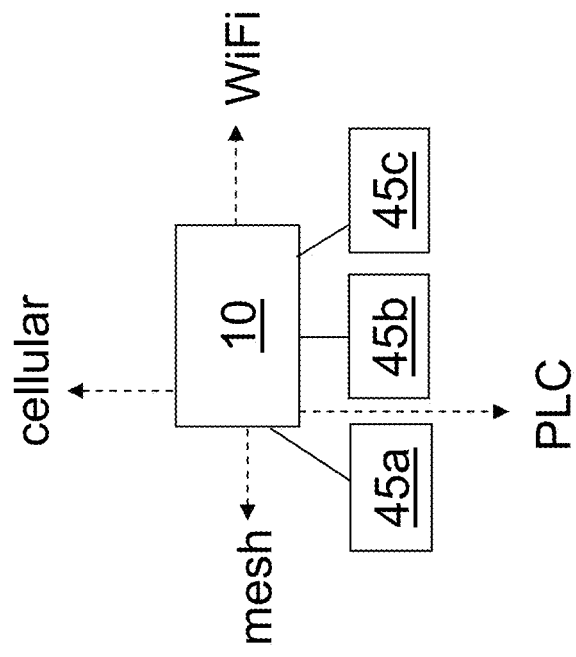
FIGS. 1a and 1b illustrate communications networks and protocols supported by exemplary communications and energy device configurations described herein.
Figure 1A:
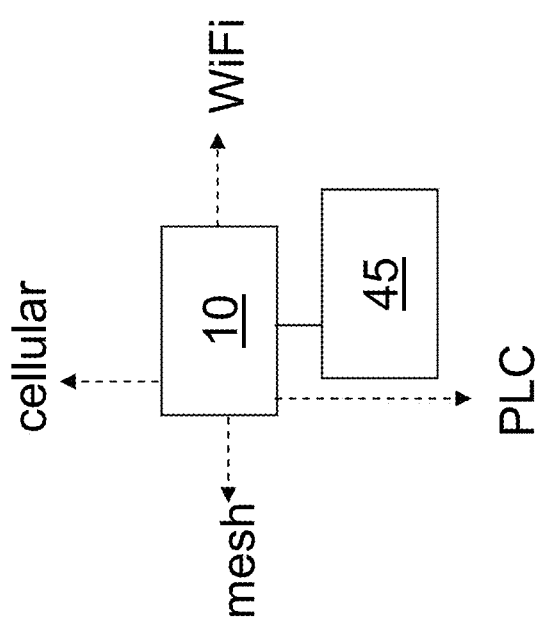

As described further herein, the communications modules described and illustrated herein support and facilitate local communications, including control and status communications and energy device processor supporting data collection. Referring to FIGS. 1a and 1b, at least the following are supported by a communications module 10 associated with a single energy device 45 (FIG. 1a) or a communications module 10 associated with multiple energy devices 45a, 45b, 45c (FIG. 1b): Advanced Metering Infrastructure (AMI) communications via standard cellular communications; AMI communications via a wireless network, e.g., WiFi, WiMAX, RF mesh; AMI communications via wired communications, e.g., power line communications (PLC); Home Area Network (HAN) communications via a HAN network, e.g., Zigbee or other in home protocols.

An energy device may include, but is not limited to, utility meters, display device (e.g., thermostats, appliances and in home devices (IHDs)), load control devices (pool pump, switches, e.g., for changing load based on a threshold versus the current cost of electricity), distribution devices (e.g., current and voltage sensors) and the like. The energy-related data from and to the energy devices may include, but is not limited to, price information, energy use information, and grid condition information (e.g., on the distribution side energy devices to facilitate switching around power outages). The Pike Research Cleantech Market Intelligence presentation entitled "Smart Grid—An Overview and Introduction" (January 2012) provides a state of the art description of grid technologies and is incorporated herein by reference.

As described below, communications modules according to the embodiments herein support more than one device (e.g., in a Communications Hub fashion as described in U.S. patent application Ser. No. 13/369,520 entitled DEVICE AND METHOD FOR FACILITATING SECURE COMMUNICATIONS OVER A CELLULAR NETWORK which is incorporated herein by reference in its entirety) and enable complex switching scenarios, wherein switch conditions may be applied to a selected subset of modules within the same network such that only certain modules are switched to a different comms network (e.g., mesh), while others remain on a first comms network (e.g., cellular). Similarly, rules may keep opted out modules on a third network, e.g., PLC, permanently. The location of the switching intelligence may be supported locally at the communications module, remotely at the control center (e.g., head end server), or a combination thereof.

A communications module (hereafter Comms Module) is included as part of a native line communication (LC) device, e.g., transceivers, and/or wireless networking nodes, e.g., original smart meters or retrofitted meters, in order to control and switch node radio communications connectivity between various wired, cellular and wireless mesh networks and modes. By employing such a Comms Module, nodes can be deployed in advance of the deployment of a full mesh network, and connectivity can be achieved in the meantime through wired, cellular or some combination thereof as controlled by the Comms Module.

There are various situations, as discussed further herein, where the ability to switch between various available network options or have simultaneous use of available networks for different communications could be used. For example, as referenced previously, PLC or cellular networks may be in use until a wireless mesh network becomes available—either through the addition of mesh access points or additional nodes with mesh capability. In this particular scenario, the Comms Module will switch from operations over the PLC and/or cellular network to operations over the mesh network. The triggers for switching between available networks could be local or remote triggers. Local triggers could include, e.g., periodic attempts to reach a collector and when successful this may trigger a switchover to mesh. Remote triggers could come from a head-end system (HES), e.g., over the cellular network as part of deployment strategy, when there is sufficient node density.

FIG. 2 illustrates an exemplary schematic showing the Comms Module 10, first cellular radio 20 and second wireless mesh radio 30. The Comms Module 10 includes microprocessor 25 and various submodules 15a, 15b and 15c for controlling communications with the cellular network via radio 20, the wireless mesh network via radio 30 and possibly the HAN. The Comms Module is able to operate both the cellular 20 and mesh network radios 30 simultaneously, as needed. In an alternative embodiment, and as one skilled in the art may appreciate, the individual submodules may also include processing capabilities in place of or in addition to the microprocessor 25.

Accordingly, in an exemplary mode of operation, while operating on the cellular network the Comms Module 10 will continuously scan for activity on the mesh network using the mesh network radio 30 as instructed by the submodule 15b and respond to any mesh communications from a nearby node, e.g., neighboring smart meter, repeater, mesh access point. Instructions from submodule 15b, may originate from a HES command received via the cellular network or instructions could be autonomously generated upon initiation of the Comms Module. If the nearby node is already associated with a mesh access point, the Comms Module will initiate the association process via this nearby node; if the nearby node is not associated with a mesh access point, the Comms Module will broadcast a request to other nearby nodes to associate with an access point. The Comms Module and all detected nearby nodes will maintain information for their respective nearby nodes in a neighbor table regardless of whether association with an access point is successful. If no nearby nodes have been detected, the Comms Module will routinely (e.g., every hour or as configured) broadcast a request to any possible nearby nodes to associate with a mesh access point. A detailed description of exemplary scanning, broadcasting, association and neighborhood table features for use with this embodiment can be found in U.S. patent application Ser. No. 12/554,135 entitled "System and Method for Implementing Mesh Network Communications using a Mesh Network Protocol," filed Sep. 4, 2009, which is incorporated herein by reference in its entirety.

Figure 3:
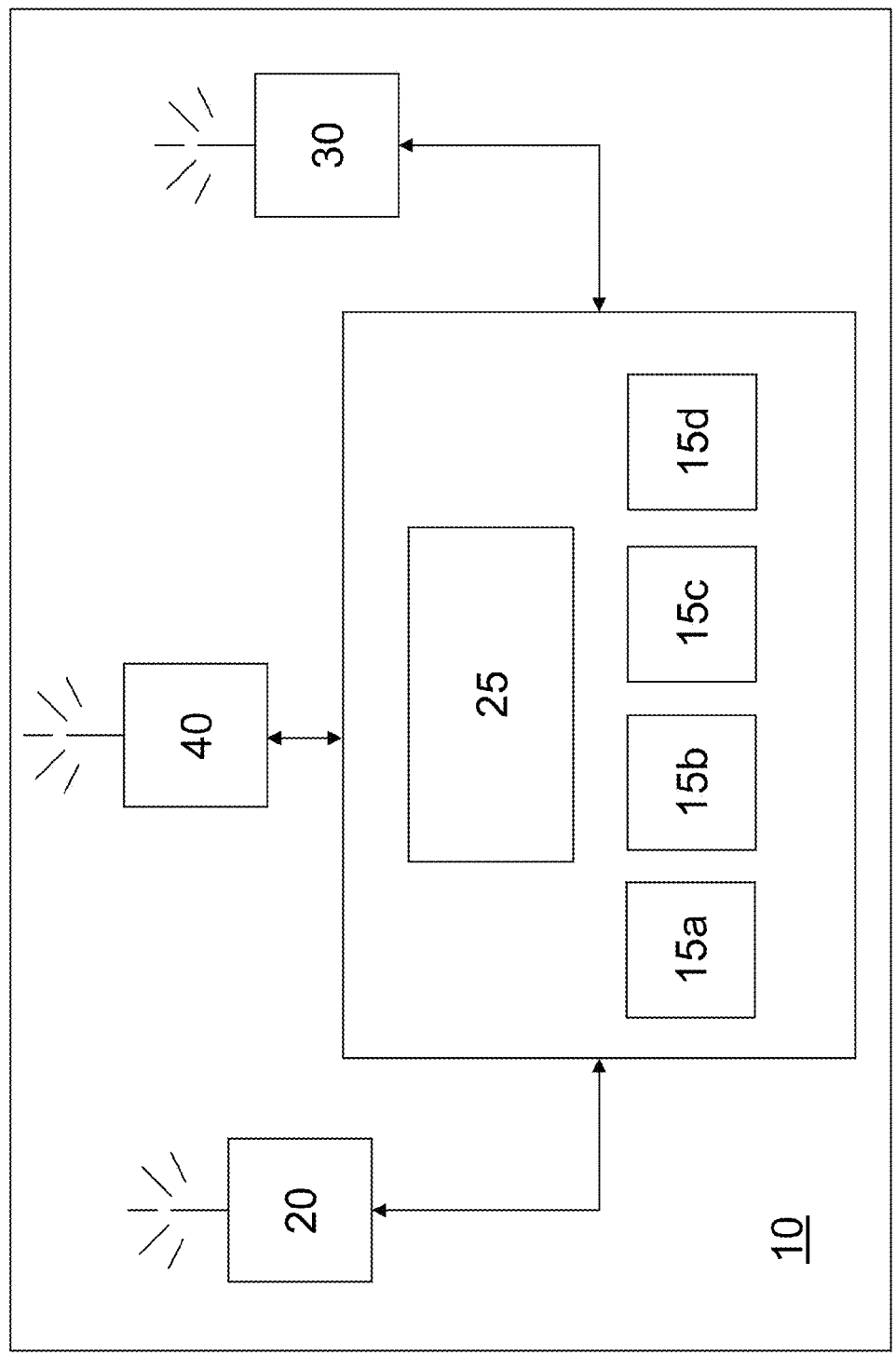
FIG. 3 illustrates an exemplary communications module in accordance with embodiments herein.

The process described previously refers to a situation where cellular is relied upon until mesh node density is such that the communications with the mesh can be initiated. In alternative embodiments, situations are contemplated wherein the Comms Module controls switching from a PLC communication network to a wireless mesh network or from a PLC to a cellular or from PLC to cellular and then to wireless mesh. The progression from PLC to cellular and/or wireless could occur in rural or remote regions as technologies such as cell service are implemented in these regions. In embodiments where PLC or wired communications are an option, the Comms Module may also control line communication devices such as transceivers. Accordingly, referring to FIG. 3, a second exemplary Comms Module could also be in communication with a PLC transceiver 40 which is controlled by submodule 15d.

Figure 4A:
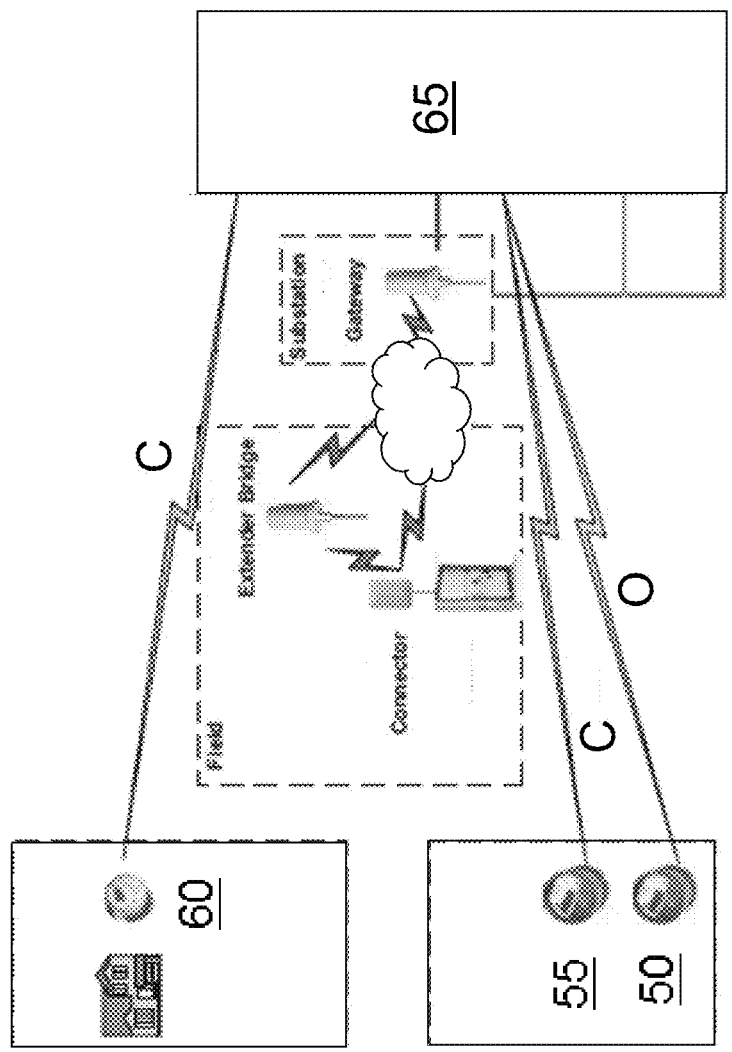
FIGS. 4a-4c illustrate exemplary system schematics for implementing communications and switching processes in accordance with embodiments herein.
Figure 4B:
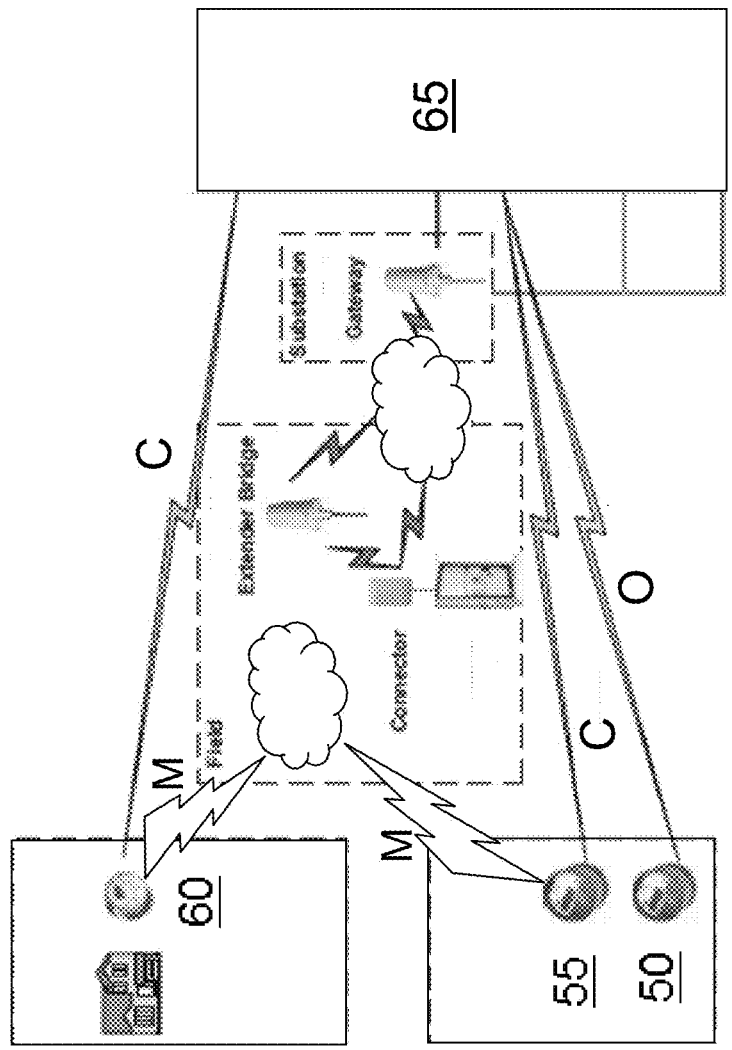
Figure 4C:
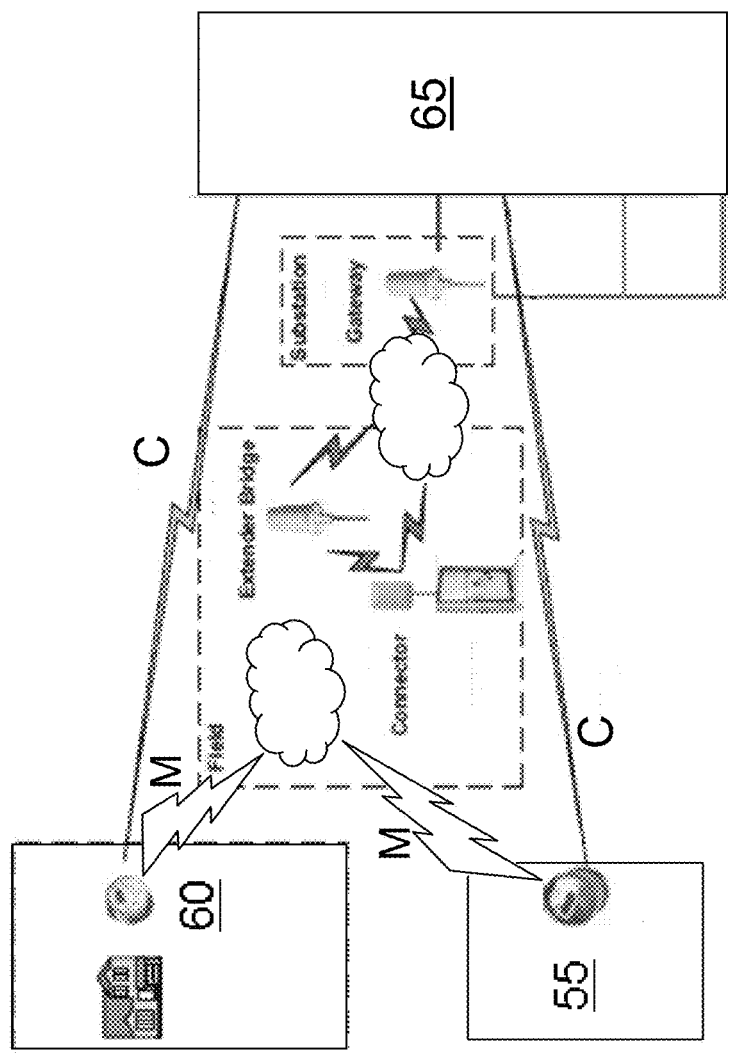

Referring to FIGS. 4a through 4c, a series of comprehensive system schematics illustrates the high level components used in the communications network switching embodiments described herein. More particularly, as discussed above, many utilities are not in a position to deploy full RF mesh network systems due to costs and other constraints, but instead would like to deploy in a targeted mode to capture immediate benefits where such a deployment can be supported and is justified.

FIG. 4a shows various system components operating in non-mesh mode, but identifies the mesh components as well for switch over implementation (e.g., FIGS. 4b and 4c). There are three types of meters illustrated: AMR meter 50, AMR+ meter 55 and AMI or smart meter 60. The meter designations change depending on meter provider, but generally it is the connectivity functionality that provides the definition. In this disclosure, an AMR meter 50 is intended to refer to a meter that does not include cellular or RF mesh communication capabilities. Instead, an AMR meter must rely on PLC, POTS, walk-by meter reading or drive-by meter reading communications protocols in order to communicate meter information back to a utility. The AMR+ meters 55 are AMR meters that have been retrofitted with a Comms Module described herein such that cellular and/or RF mesh communications are now enabled. Finally, AMI meters 60 are embedded with advanced metering infrastructure communications capabilities, e.g., cellular and/or mesh, out of the box. Further to FIG. 4a, the infrastructure supporting extended RF mesh communications over WAN (e.g., 5.8 GHz) is shown, e.g., connectors, extenders, gateways, but the communications from the representative meters are limited to cellular (C) or other non-mesh (O). The utility 65 may actually include multiple servers running various programs thereon for processing received data and/or provided instructions to meters or other parts of the metering and communications infrastructure. The utility 65 may include third party subsystems (HES) which directly receive some or all of the data from the meters and provide instructions to the meters or other parts of the metering and communications infrastructure and then either provide means for access thereto by the utility (e.g., through Web or other interface) or provide results of operation thereon to the utility back-office systems.

FIG. 4b illustrates the multi-mode situation wherein some areas of utility deployment have reached density sufficient to sustain RF mesh communications; first over NAN (e.g., 2.4 GHz) and then extended through WAN as described above. As described herein, the AMR+ meters 55 and AMI meters 60 within the targeted area switch from cellular communications (C) to mesh communications (M) in accordance with a switch over process, such as that described above. Further to the description above, in an exemplary embodiment, instructions from submodule 15b originate from a HES command that was generated by the HES when a switch application thereon received a list of targeted meters. Prior to instructing a meter to make the switch from cellular to mesh, a test command may be given to test an individual meter's ability to associate with a mesh network. If the conditions for association with a mesh are favorable, i.e., various predetermined criteria are reported back from meter to HES, the HES may command the targeted meter to disconnect from the cellular network and associate and operate on the mesh network. A predetermined operations testing period may be defined during which the targeted meter determines whether to remain on the mesh network or return to the cell network based on operating success. Such testing period may be monitored locally by the submodule 15b, remotely by the HES or as a result of a combination of the two. If testing period is locally monitored, e.g., by submodule 15b, and it is determined that operating success is poor and an automatic switch back to cellular is implemented, this information is communicated back to the HES during next cellular communication therewith. If switch to mesh is successful, this information is reported back to the HES via the mesh network. The HES may connect to the cellular network's account provisioning system using a VPN (virtual private network) connection. Upon acknowledgement of a successful cellular to mesh switch, the HES may terminate the cellular account for the targeted meter.

FIG. 4c illustrates a preferred multi-mode situation wherein all deployed meters are capable of operating on the cellular and mesh networks and, ideally, would be operating on the mesh network at all times.

The Comms Module could facilitate switching from a walk-by or drive-by meter collection non-network process, e.g., short-range radio, to one of a PLC, cellular or mesh communications network. The rules for when to switch from one of walk-by or drive-by to one of PLC (or other wired solution), cellular or mesh may include: recognition at the Comms Module that hardware (e.g., PLC transceiver, mesh node) or software has been installed and is operational, e.g., through communication from the hardware itself and/or through a communication received by the HES or other source; an indication of cellular service; and the like.

As a still further variation, the present embodiments facilitate a scenario wherein multiple communication networks remain active and are supported simultaneously by a module. For example, a first operation, e.g., firmware upgrade to a node, could operate on the cellular network, while the mesh network continues to communicate metering data.

And in still a further implementation, the rules and communications module may support temporary switching to, e.g., a cellular network, for when the NAN technology is switched from technology A to technology Z.

In yet another embodiment, the communications module may support communication over a consumer internet network, e.g., through WiFi or the like.

Returning to the first embodiment, wherein the Comms Module controls switching from the cellular network to the mesh network, in a specific implementation, various rules may be established (locally, using drive-by instructions or via remote instruction from HES) and implemented by the Comms Module to control when the switching occurs. For example, once a mesh node, e.g., meter, is associated with a mesh access point, the criteria for switching from the cellular network to the mesh network and using the mesh network instead of the cellular network for the reporting of data may include: the Comms Module must have at least 2 parents in the tree network leading to the mesh access point to which it is associated; the Comms Module must have received confirmation from the HES that it is successfully communicating with the back-end system; the Comms Module must be fully provisioned by the HES (e.g., fully configured with necessary operational parameters and security keys) to provide data securely thereto and receive instructions therefrom.

Similarly, if at any point the Comms Module detects less than 2 parents or otherwise loses connectivity with the HES, the Comms Module facilitates a switch back to the cellular network. In a particular implementation, switching back could mean "setting to default," wherein the cellular network is only used as needed (e.g. 1 time a day), and the node can keep on trying to mesh in the mean time. Accordingly, the actual switch decision may only be made at the time communication is required with the HES (e.g. to send a usage report from the node).

Similarly, the HES may decide to use the cellular option if it fails to connect via the mesh (after X number of retries), e.g., for an on-demand read.

The system and methods described herein provide at least the following advantages over the existing systems and methods: the flexibility to deploy meters and collect metering or certain performance data (e.g., capacity, density, backhaul availability, etc.) over the cellular network before the mesh network is operational; the ability to control handover of the system and network management, e.g., during initial installation, the system may be managed via cellular network from a HES in the cloud or by third-party installer server. After hand-over it is switched to the utility's mesh and HES; the ability to transition from the cellular network and its associated usage-based operational expenses to the wireless mesh network; the ability to use the cellular network as a failover alternative in the event the mesh or backhaul network is disrupted; to offload traffic if the mesh reaches capacity; or to switch to cellular after a high number of opt-outs result in a very low regional density which may not be viable for meshing; and the availability of extra capacity if needed, e.g. some operations like firmware upgrades could use alternative cellular paths while the mesh remains operational (the purpose would be to alleviate congestion, e.g., in collectors, or to improve overall throughput).

The hybrid PLC, cellular and/or wireless mesh network configurations described above can be further extended to additionally encompass the home area network (HAN), i.e., in addition to the communications module, end-user devices such as in-home devices (IHDs) (e.g., programmable communicating thermostats) and facilitating devices such as energy management servers (e.g., HAN gateways or home energy gateways). With additional communications technology to support HAN communications, the Comms Module provides HAN connectivity via either cellular or wireless mesh network technology. As a result, HAN applications such as load control, demand response, and other demand-side management programs realize the benefits of deployment flexibility, transitional use of cellular backhaul, and multiple failover alternatives. HAN capability may be deployed independent of an AMI network and use the cellular network occasionally to configure the HAN (e.g., Time of Use (TOU) rate plans that are only used by the HAN). The AMI network can be added later to include metering which then turns on the mesh. The hybrid Comms Module described herein facilitates the ability of an energy utility to deploy smart grid functionality for both AMI and demand-side management programs across all of its service territory, either via PLC and/or cellular in advance of the wireless mesh network deployment or via cellular in the event mesh network connectivity is for some reason disrupted.

Importantly, the Comms Module as described herein can be a part of much more complex system, e.g., smart grid architecture, for smart metering applications. Such a system includes multiple other components, e.g., which are not impacted by the change of the communications mechanism facilitated by the Comms Module. In other words, unless the components are directly involved in the transition from one communications mechanism to another, the changes are invisible to other components of the larger smart grid architecture. For example, the meter data management ("MDM") system does not know or care whether the meter is connected via cellular, mesh, or PLC; it is only concerned with managing the received data.

Similarly, the Comms Module and processes described herein facilitate changes to the communications path without interrupting electricity flow or electricity billing; which is critical to the utilities and, more importantly, the customers.

The automated system and processes described herein can be embodied in hardware, software and combinations of hardware and software elements to carry out one or more processes described herein. The software embodiments and applications may include but are not limited to firmware, resident software, microcode, etc. Furthermore, certain components of the embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device. The medium can utilize electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W) and DVD.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element.

The methods described herein may include in whole or part workflows. Such workflows may include inquiry and response steps carried out for example via a web-based interface, a spreadsheet, existing software applications, etc. Embodiments of the tool or solution may include workflows that automate the collection and use of information in various ways, e.g., inquiries and responses; polling individuals, entities or users; HTML interfaces; integration with spreadsheets or other applications; and integration with external systems. Such information once collected may be arranged in a desired framework.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

The invention claimed is:

1. A process for switching to or between multiple networks to optimize communication between a fixed position energy device in proximity to at least one of the multiple networks and a head end server to facilitate communication of energy-related data therebetween comprising:
   receiving instructions at a fixed position communications module that establish rules for the communications module to control switching communications to or from the energy device associated with the communications module from a first network via a first transceiver at the fixed position of the communications module to a second network via a second transceiver at the fixed position of the communications module, which rules cause periodic scanning by said second transceiver to determine a desirability of using the second network to provide communications of said energy-related data; and
   instructing by the communications module, upon a determination of the desirability of using the second network to provide communications of said energy-related data, the first transceiver to cease communications with the energy device and instructing the second transceiver to initiate communications with the energy device to facilitate communication of energy-related data to or from the energy device and the head end server;
   wherein the established rules provide a desired progression for switching communications based on financial cost-effectiveness from the first network, where financial cost of communication is usage-based, to the second network, where financial cost of communication is not usage-based;
   wherein the energy related data includes at least price information for communication to the energy device; and
   wherein the first network is cellular-based and the second network is mesh node-based.

2. The process according to claim 1, wherein the second network is a wireless mesh network.

3. The process according to claim 2, wherein receiving instructions further includes:
   periodically scanning by the communications module for availability of data from one or more neighboring mesh devices;
   collecting the data by the communications module from the one or more available neighboring mesh devices; and
   determining from the collected data if the one or more available neighboring energy devices is a mesh access point or is in communication with a mesh access point and, if so determined, associating the energy device with the one of the one or more available neighboring mesh devices.

4. The process according to claim 1, wherein the instructions to the first transceiver to cease communications with the energy device are applicable to a first subset of communications such that the first subset of communications will occur on the second network and remaining communications remain on the first network.

5. The process according to claim 1, further comprising:
   receiving instructions at a communications module to switch communications to or from the energy device associated with the communications module from the second network to a third network; and
   instructing by the communications module the second transceiver of the second network to cease communications with the energy device and instructing a third transceiver of a third network to initiate communications with the energy device.

6. The process according to claim 5, wherein the third network is a power line communications (PLC) network.

7. The process according to claim 5, wherein the instructions to the first transceiver to cease communications with the energy device are applicable to a first subset of communications such that the first subset of communications will occur on the second network and remaining communications remain on the first network.

8. A process for switching to or between multiple networks to optimize communication between multiple energy devices in proximity to at least one of the multiple networks and a head end server to facilitate communication of energy-related data therebetween comprising:
   receiving instructions at a communications module that establishes rules at the communications module to control a predetermined preferential switching of communications to or from the multiple energy devices associated with the communications module from a first network to a second network; and
   instructing by the communications module, upon an occurrence of a trigger generated according to the rules of the communications module, a first transceiver of a first network, which first transceiver is located at a fixed location, to cease communications with the multiple energy devices and instructing a second transceiver of a second network, which second transceiver is located at a fixed location, to initiate communications with the multiple devices to facilitate communication of energy-related data to or from the multiple energy devices and the head end server;
   wherein the established rules provide a desired progression for switching communications based on financial cost-effectiveness from the first network, where financial cost of communication is usage-based, to the second network, where financial cost of communication is not usage-based;
   wherein the energy related data includes at least price information for communication to the energy device; and wherein the first network is a cellular-based and the second network is a mesh node-based.

9. The process according to claim 8, wherein the second network is a wireless mesh network and the instructions to switch from the first network to the second network apply to a subset of the multiple energy devices and not to remaining multiple energy devices.

10. A system for switching to or between multiple networks to optimize communication of energy-related data comprising:
a communications module at a fixed location including:
a first submodule controlling a first transceiver at the fixed location of the communications module for communicating with a first network using a first network protocol, and
a second submodule controlling a second transceiver at the fixed location of the communications module for communicating with a second network using a second network protocol;
an energy device located at a fixed position and associated with the communications module, wherein the energy device tracks energy-related data that is available to the communications module for communications thereby; and
a server for receiving energy-related data from the communications module via at least one of the first and second networks;
wherein the communication module receives instructions that establish rules for the communications module to control switching communications to or from the energy device from the first network to the second network,
wherein the established rules provide a desired progression for switching communications based on financial cost-effectiveness from the first network, where financial cost of communication is usage-based, to the second network, where financial cost of communication is not usage-based;
wherein the energy related data includes at least price information for communication to the energy device; and
wherein the first network is cellular-based and the second network is mesh node-based.

11. The system according to claim 10, further including a third submodule controlling a third transceiver for communicating with a third network using a third network protocol.

12. The system according to claim 11, wherein the third network is a PLC network.

13. The system according to claim 11, wherein the first network is a cellular network, the second network is a first RF mesh network and the third network is a second RF mesh network.

14. The system according to claim 13, further comprising at least one in-home device in communication with the energy device over the second RF mesh network, wherein the at least one in-home device tracks energy related data for at least one appliance associated with a dwelling.

15. The system according to claim 10, wherein the communications module further comprises a processor for providing individual instructions to the first and second submodules regarding which of the first and second networks should be used to communicate an energy-related data communication from the energy device to the server.

16. The system according to claim 15, wherein the processor receives the individual instructions from the server.

17. The system according to claim 11, wherein the communications module further comprises a processor for providing individual instructions to the first, second and third submodules regarding which of the first, second and third networks should be used to communicate an energy-related data communication from the energy device to the server.

18. The system according to claim 17, wherein the processor receives the individual instructions from the server.

19. A communications module at a fixed location for switching to or between multiple networks to optimize communication of energy-related data to and from a fixed position energy device associated with the communications module comprising:
a first submodule controlling a first transceiver at the fixed location of the communications module for communicating energy-related data via a first network using a first network protocol when a first predetermined condition is met; and
a second submodule controlling a second transceiver at the fixed location of the communications module for communicating energy-related data via a second network using a second network protocol when a second predetermined condition is met, wherein said second predetermined condition includes a receipt of instructions that establish rules to cause periodic scanning by said second transceiver after said first predetermined condition is met, to determine availability of the second network to provide communications of said energy-related data, and if determined to be available, causes said second transceiver to provide communications of said energy-related data via said second network;
wherein the established rules provide a desired progression for switching communications based on financial cost-effectiveness from the first network, where financial cost of communication is usage-based, to the second network, where financial cost of communication is not usage-based;
wherein the energy related data includes at least price information for communication to the energy device; and
wherein the first network is cellular-based and the second network is mesh node-based.

20. The communications module of claim 19, further comprising:
a third submodule controlling a third transceiver at the fixed location of the communications module for communicating energy-related data via a third network using a third network protocol when a third predetermined condition is met.

21. The communications module of claim 20, further comprising:
a fourth submodule controlling a fourth transceiver at the fixed location of the communications module for communicating energy-related data via a fourth network using a fourth network protocol when a fourth predetermined condition is met.

22. The communications module of claim 21, wherein the third and fourth networks are selected from the group consisting of RF mesh, cellular, WiFi and power line communications (PLC).

23. The communications module of claim 19, wherein the first and second predetermined conditions include at least one of: receipt of instructions at the communications module from a server to communicate on one of the first and second networks and unavailability of one or the other of the first and second networks.

24. The process according to claim 1, where the determination of the desirability of using the second network to provide communications of said energy-related data is based on the established rules relating to performance of the second network.

25. The process according to claim 1, where the determination of the desirability of using the second network to provide communications of said energy-related data is based on the established rules relating to factors other than performance of the second network.

26. The process according to claim 25, where the established rules relating to factors other than performance of the second network relate to the second network having a node density sufficient to support failover.

27. The process according to claim 1, where the second network is a wireless mesh network, and its availability is based on the mesh network reaching a node density sufficient to support failover.

* * * * *